United States Patent
High et al.

(10) Patent No.: US 10,611,614 B2
(45) Date of Patent: *Apr. 7, 2020

(54) SHOPPING FACILITY ASSISTANCE SYSTEMS, DEVICES AND METHODS TO DRIVE MOVABLE ITEM CONTAINERS

(71) Applicant: Walmart Apollo, LLC, Bentonville, AR (US)

(72) Inventors: Donald R. High, Noel, MO (US); David C. Winkle, Bella Vista, AR (US); Michael D. Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/892,250

(22) Filed: Feb. 8, 2018

(65) Prior Publication Data

US 2018/0170729 A1 Jun. 21, 2018

Related U.S. Application Data

(63) Continuation of application No. 15/061,474, filed on Mar. 4, 2016, now Pat. No. 9,908,760.
(Continued)

(51) Int. Cl.
*B66F 9/06* (2006.01)
*G06Q 30/06* (2012.01)
(Continued)

(52) U.S. Cl.
CPC .............. *B66F 9/063* (2013.01); *A47F 3/08* (2013.01); *A47F 10/04* (2013.01); *B60P 3/06* (2013.01);
(Continued)

(58) Field of Classification Search
CPC .. G06Q 30/0601; G06Q 10/087; G06Q 50/28; G06Q 30/0641; G06Q 30/0633;
(Continued)

(56) References Cited

U.S. PATENT DOCUMENTS

| | | | |
|---|---|---|---|
| 1,001,732 A | 8/1911 | Cummings |
| 1,774,653 A | 9/1930 | Marriott |

(Continued)

FOREIGN PATENT DOCUMENTS

| | | |
|---|---|---|
| CA | 2524037 | 5/2006 |
| CA | 2625885 | 4/2007 |

(Continued)

OTHER PUBLICATIONS

U.S. Appl. No. 15/060,953, filed Mar. 4, 2016, High.
(Continued)

*Primary Examiner* — Dale W Hilgendorf
(74) *Attorney, Agent, or Firm* — Fitch, Even, Tabin & Flannery LLP

(57) ABSTRACT

Some embodiments include a motorized transport unit providing customer assistance at a shopping facility, comprises: a transceiver; a control circuit; a motorized wheel system; a lift system; and a memory coupled to the control circuit and storing computer instructions that when executed by the control circuit cause the control circuit to: activate a motorized wheel system, while continuing to monitor location information, to position the motorized transport unit under the item container and aligned, based on the location information, relative to a frame of the item container; and activate the lift system to lift on the frame of the item container lifting a first portion of the item container such one or more wheels of the item container are lifted off of a floor while two or more other wheels of the item container remain in contact with the floor.

16 Claims, 9 Drawing Sheets

Related U.S. Application Data

(60) Provisional application No. 62/303,021, filed on Mar. 3, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/292,084, filed on Feb. 5, 2016, provisional application No. 62/214,826, filed on Sep. 4, 2015, provisional application No. 62/214,824, filed on Sep. 4, 2015, provisional application No. 62/207,858, filed on Aug. 20, 2015, provisional application No. 62/205,539, filed on Aug. 14, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/202,744, filed on Aug. 7, 2015, provisional application No. 62/202,747, filed on Aug. 7, 2015, provisional application No. 62/194,131, filed on Jul. 17, 2015, provisional application No. 62/194,127, filed on Jul. 17, 2015, provisional application No. 62/194,121, filed on Jul. 17, 2015, provisional application No. 62/194,119, filed on Jul. 17, 2015, provisional application No. 62/185,478, filed on Jun. 26, 2015, provisional application No. 62/182,339, filed on Jun. 19, 2015, provisional application No. 62/175,182, filed on Jun. 12, 2015, provisional application No. 62/171,822, filed on Jun. 5, 2015, provisional application No. 62/165,416, filed on May 22, 2015, provisional application No. 62/165,579, filed on May 22, 2015, provisional application No. 62/165,586, filed on May 22, 2015, provisional application No. 62/157,388, filed on May 5, 2015, provisional application No. 62/152,421, filed on Apr. 24, 2015, provisional application No. 62/152,440, filed on Apr. 24, 2015, provisional application No. 62/152,465, filed on Apr. 24, 2015, provisional application No. 62/152,610, filed on Apr. 24, 2015, provisional application No. 62/152,667, filed on Apr. 24, 2015, provisional application No. 62/152,711, filed on Apr. 24, 2015, provisional application No. 62/152,630, filed on Apr. 24, 2015, provisional application No. 62/138,877, filed on Mar. 26, 2015, provisional application No. 62/138,885, filed on Mar. 26, 2015, provisional application No. 62/129,727, filed on Mar. 6, 2015, provisional application No. 62/129,726, filed on Mar. 6, 2015.

(51) Int. Cl.

| | |
|---|---|
| *A47F 10/04* | (2006.01) |
| *G05D 1/02* | (2020.01) |
| *H04N 7/18* | (2006.01) |
| *G06Q 50/28* | (2012.01) |
| *G06Q 10/08* | (2012.01) |
| *B62B 5/00* | (2006.01) |
| *B60P 3/06* | (2006.01) |
| *G05D 1/00* | (2006.01) |
| *H04W 4/33* | (2018.01) |
| *H04W 4/02* | (2018.01) |
| *A47F 3/08* | (2006.01) |
| *G01C 21/20* | (2006.01) |

(52) U.S. Cl.
CPC .......... *B62B 5/0026* (2013.01); *B62B 5/0069* (2013.01); *B62B 5/0076* (2013.01); *G01C 21/206* (2013.01); *G05D 1/0011* (2013.01); *G05D 1/0088* (2013.01); *G05D 1/021* (2013.01); *G05D 1/028* (2013.01); *G05D 1/0276* (2013.01); *G06Q 10/087* (2013.01); *G06Q 30/0601* (2013.01); *G06Q 30/0633* (2013.01); *G06Q 30/0641* (2013.01); *G06Q 50/28* (2013.01); *H04N 7/183* (2013.01); *H04W 4/02* (2013.01); *H04W 4/33* (2018.02)

(58) Field of Classification Search
CPC .. G05D 1/0011; G05D 1/0276; G05D 1/0088; G05D 1/021; G05D 1/028; G01C 21/206; B60P 3/06; B62B 5/0076; B62B 5/0026; B62B 5/0069; H04N 7/183; A47F 3/08
See application file for complete search history.

(56) References Cited

U.S. PATENT DOCUMENTS

| | | | |
|---|---|---|---|
| 2,669,345 A | 2/1954 | Brown | |
| 3,765,546 A | 10/1973 | Westerling | |
| 3,866,780 A * | 2/1975 | Miller et al. | ............ B66F 9/183 |
| | | | 414/623 |
| 4,071,740 A | 1/1978 | Gogulski | |
| 4,158,416 A | 6/1979 | Podesta | |
| 4,588,349 A | 5/1986 | Reuter | |
| 4,672,280 A | 6/1987 | Honjo | |
| 4,771,840 A | 9/1988 | Keller | |
| 4,777,416 A | 10/1988 | George, II | |
| 4,791,482 A | 12/1988 | Barry | |
| 4,868,544 A | 9/1989 | Havens | |
| 4,911,608 A | 3/1990 | Krappitz | |
| 5,119,087 A | 6/1992 | Lucas | |
| 5,279,672 A | 1/1994 | Betker | |
| 5,287,266 A | 2/1994 | Malec | |
| 5,295,551 A | 3/1994 | Sukonick | |
| 5,363,305 A | 11/1994 | Cox | |
| 5,380,138 A | 1/1995 | Kasai | |
| 5,384,450 A | 1/1995 | Goetz, Jr. | |
| 5,395,206 A | 3/1995 | Cerny, Jr. | |
| 5,402,051 A | 3/1995 | Fujiwara | |
| 5,548,515 A | 8/1996 | Pilley | |
| 5,632,381 A | 5/1997 | Thust | |
| 5,652,489 A | 7/1997 | Kawakami | |
| 5,671,362 A | 9/1997 | Cowe | |
| 5,777,571 A | 7/1998 | Chuang | |
| 5,801,340 A | 9/1998 | Peter | |
| 5,860,485 A * | 1/1999 | Ebbenga | .................. A47F 10/04 |
| | | | 180/19.2 |
| 5,917,174 A | 6/1999 | Moore | |
| 5,920,261 A | 7/1999 | Hughes | |
| 5,969,317 A | 10/1999 | Espy | |
| 6,018,397 A | 1/2000 | Cloutier | |
| 6,199,753 B1 | 3/2001 | Tracy | |
| 6,201,203 B1 | 3/2001 | Tilles | |
| 6,240,342 B1 | 5/2001 | Fiegert | |
| 6,339,735 B1 | 1/2002 | Peless | |
| 6,365,857 B1 | 4/2002 | Maehata | |
| 6,374,155 B1 | 4/2002 | Wallach | |
| 6,394,519 B1 | 5/2002 | Byers | |
| 6,431,078 B2 | 8/2002 | Serrano | |
| 6,522,952 B1 | 2/2003 | Arai | |
| 6,525,509 B1 | 2/2003 | Petersson | |
| 6,535,793 B2 | 3/2003 | Allard | |
| 6,550,672 B1 | 4/2003 | Tracy | |
| 6,571,197 B1 | 5/2003 | Frank | |
| 6,571,693 B1 | 6/2003 | Kaldenberg | |
| 6,584,375 B2 | 6/2003 | Bancroft | |
| 6,584,376 B1 | 6/2003 | VanKommer | |
| 6,587,835 B1 | 7/2003 | Treyz | |
| 6,600,418 B2 | 7/2003 | Francis | |
| 6,601,759 B2 | 8/2003 | Fife | |

(56) References Cited

U.S. PATENT DOCUMENTS

| | | |
|---|---|---|
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,850,899 B1 | 2/2005 | Chow |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |
| 6,954,695 B2 | 10/2005 | Bonilla |
| 6,967,455 B2 | 11/2005 | Nakadai |
| 6,975,997 B1 | 12/2005 | Murakami |
| 7,039,499 B1 | 5/2006 | Nasr |
| 7,066,291 B2 * | 6/2006 | Martins et al. ........ G05D 1/028 180/167 |
| 7,101,113 B2 | 9/2006 | Hughes |
| 7,101,139 B1 | 9/2006 | Benedict |
| 7,117,902 B2 | 10/2006 | Osborne |
| 7,145,562 B2 | 12/2006 | Schechter |
| 7,147,154 B2 | 12/2006 | Myers |
| 7,177,820 B2 | 2/2007 | McIntyre |
| 7,184,586 B2 | 2/2007 | Jeon |
| 7,205,016 B2 | 4/2007 | Garwood |
| 7,206,753 B2 | 4/2007 | Bancroft |
| 7,222,363 B2 | 5/2007 | Rice |
| 7,233,241 B2 | 6/2007 | Overhultz |
| 7,234,609 B2 | 6/2007 | DeLazzer |
| 7,261,511 B2 | 8/2007 | Felder |
| 7,367,245 B2 | 5/2008 | Okazaki |
| 7,381,022 B1 | 6/2008 | King |
| 7,402,018 B2 | 7/2008 | Mountz |
| 7,431,208 B2 | 10/2008 | Feldman |
| 7,447,564 B2 | 11/2008 | Yasukawa |
| 7,463,147 B1 | 12/2008 | Laffoon |
| 7,474,945 B2 | 1/2009 | Matsunaga |
| 7,487,913 B2 | 2/2009 | Adema |
| 7,533,029 B2 | 5/2009 | Mallett |
| 7,554,282 B2 | 6/2009 | Nakamoto |
| 7,556,108 B2 | 7/2009 | Won |
| 7,556,219 B2 | 7/2009 | Page |
| 7,587,756 B2 | 9/2009 | Peart |
| 7,613,544 B2 | 11/2009 | Park |
| 7,627,515 B2 | 12/2009 | Borgs |
| 7,636,045 B2 | 12/2009 | Sugiyarna |
| 7,648,068 B2 | 1/2010 | Silverbrook |
| 7,653,603 B1 | 1/2010 | Holtkamp, Jr. |
| 7,658,327 B2 | 2/2010 | Tuchman |
| 7,689,322 B2 | 3/2010 | Tanaka |
| 7,693,605 B2 | 4/2010 | Park |
| 7,693,745 B1 | 4/2010 | Pomerantz |
| 7,693,757 B2 | 4/2010 | Zimmerman |
| 7,706,917 B1 | 4/2010 | Chiappetta |
| 7,716,064 B2 | 5/2010 | McIntyre |
| 7,726,563 B2 | 6/2010 | Scott |
| 7,762,458 B2 | 7/2010 | Stawar |
| 7,783,527 B2 | 8/2010 | Bonner |
| 7,787,985 B2 | 8/2010 | Tsujimoto |
| 7,817,394 B2 | 10/2010 | Mukheriee |
| 7,826,919 B2 * | 11/2010 | D'Andrea et al. ..... G05D 1/021 700/214 |
| 7,835,281 B2 | 11/2010 | Lee |
| 7,894,932 B2 | 2/2011 | Mountz |
| 7,894,939 B2 | 2/2011 | Zini |
| 7,957,837 B2 | 6/2011 | Ziegler |
| 7,969,297 B2 | 6/2011 | Haartsen |
| 7,996,109 B2 | 8/2011 | Zini |
| 8,010,230 B2 | 8/2011 | Zini |
| 8,032,249 B1 | 10/2011 | Shakes |
| 8,041,455 B2 | 10/2011 | Thorne |
| 8,050,976 B2 | 11/2011 | Staib |
| 8,065,032 B2 | 11/2011 | Stiffer |
| 8,065,353 B2 | 11/2011 | Eckhoff-Hornback |
| 8,069,092 B2 | 11/2011 | Bryant |
| 8,083,013 B2 | 12/2011 | Bewley |
| 8,099,191 B2 | 1/2012 | Blanc |
| 8,103,398 B2 | 1/2012 | Duggan |
| 8,195,333 B2 | 6/2012 | Ziegler |
| 8,239,276 B2 | 8/2012 | Lin |
| 8,244,041 B1 | 8/2012 | Silver |
| 8,248,467 B1 | 8/2012 | Ganick |
| 8,260,456 B2 | 9/2012 | Siegel |
| 8,269,456 B2 | 9/2012 | Hui |
| 8,284,240 B2 | 10/2012 | Saint-Pierre |
| 8,295,542 B2 | 10/2012 | Albertson |
| 8,321,303 B1 | 11/2012 | Krishnamurthy |
| 8,325,036 B1 | 12/2012 | Fuhr |
| 8,342,467 B2 | 1/2013 | Stachowski |
| 8,352,110 B1 | 1/2013 | Szybalski |
| 8,359,122 B2 | 1/2013 | Koselka |
| 8,380,349 B1 | 2/2013 | Hickman |
| 8,393,846 B1 | 3/2013 | Coots |
| 8,412,400 B2 | 4/2013 | DAndrea |
| 8,423,280 B2 | 4/2013 | Edwards |
| 8,425,153 B1 | 4/2013 | South |
| 8,425,173 B2 | 4/2013 | Lert |
| 8,429,004 B2 | 4/2013 | Hamilton |
| 8,430,192 B2 | 4/2013 | Gillett |
| 8,433,470 B1 | 4/2013 | Szybalski |
| 8,433,507 B2 | 4/2013 | Hannah |
| 8,437,875 B2 | 5/2013 | Hernandez |
| 8,444,369 B2 | 5/2013 | Watt |
| 8,447,863 B1 | 5/2013 | Francis, Jr. |
| 8,452,450 B2 | 5/2013 | Dooley |
| 8,474,090 B2 | 7/2013 | Jones |
| 8,494,908 B2 | 7/2013 | Herwig |
| 8,504,202 B2 | 8/2013 | Ichinose |
| 8,508,590 B2 | 8/2013 | Laws |
| 8,510,033 B2 | 8/2013 | Park |
| 8,511,606 B1 | 8/2013 | Lutke |
| 8,515,580 B2 | 8/2013 | Taylor |
| 8,516,651 B2 | 8/2013 | Jones |
| 8,538,577 B2 | 9/2013 | Bell |
| 8,544,858 B2 | 10/2013 | Eberlein |
| 8,571,700 B2 | 10/2013 | Keller |
| 8,572,712 B2 | 10/2013 | Rice |
| 8,577,538 B2 | 11/2013 | Lenser |
| 8,587,662 B1 | 11/2013 | Moll |
| 8,588,969 B2 | 11/2013 | Frazier |
| 8,594,834 B1 | 11/2013 | Clark |
| 8,606,314 B2 | 12/2013 | Barnes, Jr. |
| 8,606,392 B2 | 12/2013 | Wurman |
| 8,639,382 B1 | 1/2014 | Clark |
| 8,645,223 B2 | 2/2014 | Ouimet |
| 8,649,557 B2 | 2/2014 | Hyung |
| 8,656,550 B2 | 2/2014 | Jones |
| 8,670,866 B2 | 3/2014 | Ziegler |
| 8,671,507 B2 | 3/2014 | Jones |
| 8,676,377 B2 | 3/2014 | Siegel |
| 8,676,420 B2 | 3/2014 | Kume |
| 8,676,480 B2 | 3/2014 | Lynch |
| 8,700,230 B1 | 4/2014 | Hannah |
| 8,708,285 B1 | 4/2014 | Carreiro |
| 8,718,814 B1 | 5/2014 | Clark |
| 8,724,282 B2 | 5/2014 | Hiremath |
| 8,732,039 B1 | 5/2014 | Chen |
| 8,744,626 B2 | 6/2014 | Johnson |
| 8,751,042 B2 | 6/2014 | Lee |
| 8,763,199 B2 | 7/2014 | Jones |
| 8,770,976 B2 | 7/2014 | Moser |
| 8,775,064 B2 | 7/2014 | Zeng |

(56) References Cited

U.S. PATENT DOCUMENTS

| | | |
|---|---|---|
| 8,798,786 B2 | 8/2014 | Wurman |
| 8,798,840 B2 | 8/2014 | Fong |
| 8,814,039 B2 | 8/2014 | Bishop |
| 8,818,556 B2 | 8/2014 | Sanchez |
| 8,820,633 B2 | 9/2014 | Bishop |
| 8,825,226 B1 | 9/2014 | Worley, III |
| 8,831,984 B2 | 9/2014 | Hoffman |
| 8,838,268 B2 | 9/2014 | Friedman |
| 8,843,244 B2 | 9/2014 | Phillips |
| 8,851,369 B2 | 10/2014 | Bishop |
| 8,882,432 B2 | 11/2014 | Bastian, II |
| 8,886,390 B2 | 11/2014 | Wolfe |
| 8,892,240 B1 | 11/2014 | Vliet |
| 8,892,241 B2 | 11/2014 | Weiss |
| 8,899,903 B1 | 12/2014 | Saad |
| 8,918,202 B2 | 12/2014 | Kawano |
| 8,918,230 B2 | 12/2014 | Chen |
| 8,930,044 B1 | 1/2015 | Peelers |
| 8,965,561 B2 | 2/2015 | Jacobus |
| 8,972,045 B1 | 3/2015 | Mountz |
| 8,972,061 B2 | 3/2015 | Rosenstein |
| 8,983,647 B1 | 3/2015 | Dwarakanath |
| 8,989,053 B1 | 3/2015 | Skaaksrud |
| 9,002,506 B1 | 4/2015 | Agarwal |
| 9,008,827 B1 | 4/2015 | Dwarakanath |
| 9,008,829 B2 | 4/2015 | Worsley |
| 9,014,848 B2 | 4/2015 | Farlow |
| 9,053,506 B2 | 6/2015 | Van Nest |
| 9,075,136 B1 | 7/2015 | Joao |
| 9,129,277 B2 | 9/2015 | MacIntosh |
| 9,170,117 B1 | 10/2015 | Abuelsaad |
| 9,173,816 B2 | 11/2015 | Reinhardt |
| 9,190,304 B2 | 11/2015 | MacKnight |
| 9,278,839 B2 | 3/2016 | Gilbride |
| 9,305,280 B1 | 4/2016 | Berg |
| 9,329,597 B2 | 5/2016 | Stoschek |
| 9,494,936 B2 | 11/2016 | Kerzner |
| 9,495,703 B1 | 11/2016 | Kaye, III |
| 9,534,906 B2 | 1/2017 | High |
| 9,550,577 B1 | 1/2017 | Beckman |
| 9,573,684 B2 | 2/2017 | Kimchi |
| 9,578,282 B1 | 2/2017 | Sills |
| 9,607,285 B1 | 3/2017 | Wellman |
| 9,623,923 B2 | 4/2017 | Riedel |
| 9,649,766 B2 | 5/2017 | Stubbs |
| 9,656,805 B1 | 5/2017 | Evans |
| 9,658,622 B2 | 5/2017 | Walton |
| 9,663,292 B1 | 5/2017 | Brazeau |
| 9,663,293 B2 | 5/2017 | Wurman |
| 9,663,295 B2 | 5/2017 | Wurman |
| 9,663,296 B1 | 5/2017 | Dingle |
| 9,747,480 B2 | 8/2017 | McAllister |
| 9,757,002 B2 | 9/2017 | Thompson |
| 9,785,911 B2 | 10/2017 | Galluzzo |
| 9,796,093 B2 | 10/2017 | Mascorro |
| 9,801,517 B2 | 10/2017 | High |
| 9,827,678 B1 | 11/2017 | Gilbertson |
| 9,875,502 B2 | 1/2018 | Kay |
| 9,875,503 B2 | 1/2018 | High |
| 9,896,315 B2 | 3/2018 | High |
| 9,908,760 B2 | 3/2018 | High |
| 9,948,917 B2 | 4/2018 | Inacio De Matos |
| 9,994,434 B2 | 6/2018 | High |
| 10,017,322 B2 | 7/2018 | High |
| 10,071,891 B2 | 9/2018 | High |
| 10,071,892 B2 | 9/2018 | High |
| 10,071,893 B2 | 9/2018 | High |
| 10,081,525 B2 | 9/2018 | High |
| 10,130,232 B2 | 11/2018 | Atchley |
| 10,138,100 B2 | 11/2018 | Thompson |
| 10,147,069 B2 | 12/2018 | Galluzzo |
| 10,189,691 B2 | 1/2019 | High |
| 10,189,692 B2 | 1/2019 | High |
| 10,239,738 B2 | 3/2019 | High |
| 10,280,054 B2 | 5/2019 | High |
| 10,351,399 B2 | 7/2019 | High |
| 2001/0042024 A1 | 11/2001 | Rogers |
| 2002/0060542 A1 | 5/2002 | Song |
| 2002/0084323 A1 | 7/2002 | Benyak |
| 2002/0095342 A1 | 7/2002 | Feldman |
| 2002/0154974 A1 | 10/2002 | Fukuda |
| 2002/0156551 A1 | 10/2002 | Tackett |
| 2002/0165638 A1 | 11/2002 | Bancroft |
| 2002/0165643 A1 | 11/2002 | Bancroft |
| 2002/0165790 A1 | 11/2002 | Bancroft |
| 2002/0170961 A1 | 11/2002 | Dickson |
| 2002/0174021 A1 | 11/2002 | Chu |
| 2003/0028284 A1 | 2/2003 | Chirnomas |
| 2003/0152679 A1 | 8/2003 | Garwood |
| 2003/0170357 A1 | 9/2003 | Garwood |
| 2003/0185948 A1 | 10/2003 | Garwood |
| 2003/0222798 A1 | 12/2003 | Floros |
| 2004/0068348 A1 | 4/2004 | Jager |
| 2004/0081729 A1 | 4/2004 | Garwood |
| 2004/0093650 A1 | 5/2004 | Martins |
| 2004/0098167 A1 | 5/2004 | Yi |
| 2004/0117063 A1 | 6/2004 | Sabe |
| 2004/0146602 A1 | 7/2004 | Garwood |
| 2004/0203633 A1 | 10/2004 | Knauerhase |
| 2004/0216339 A1 | 11/2004 | Garberg |
| 2004/0217166 A1 | 11/2004 | Myers |
| 2004/0221790 A1 | 11/2004 | Sinclair |
| 2004/0225613 A1 | 11/2004 | Narayanaswami |
| 2004/0249497 A1 | 12/2004 | Saigh |
| 2005/0008463 A1 | 1/2005 | Stehr |
| 2005/0047895 A1 | 3/2005 | Lert |
| 2005/0072651 A1 | 4/2005 | Wieth |
| 2005/0080520 A1 | 4/2005 | Kline |
| 2005/0086051 A1 | 4/2005 | Brulle-Drews |
| 2005/0104547 A1 | 5/2005 | Wang |
| 2005/0149414 A1 | 7/2005 | Schrodt |
| 2005/0154265 A1 | 7/2005 | Miro |
| 2005/0177446 A1 | 8/2005 | Hoblit |
| 2005/0216126 A1 | 9/2005 | Koselka |
| 2005/0222712 A1 | 10/2005 | Orita |
| 2005/0230472 A1 | 10/2005 | Chang |
| 2005/0238465 A1 | 10/2005 | Razumov |
| 2005/0246248 A1 | 11/2005 | Vesuna |
| 2005/0267826 A1 | 12/2005 | Levy |
| 2006/0107067 A1 | 5/2006 | Safal |
| 2006/0147087 A1 | 7/2006 | Goncalves |
| 2006/0163350 A1 | 7/2006 | Melton |
| 2006/0178777 A1 | 8/2006 | Park |
| 2006/0206235 A1 | 9/2006 | Shakes |
| 2006/0210382 A1 | 9/2006 | Mountz |
| 2006/0220809 A1 | 10/2006 | Stigall |
| 2006/0221072 A1 | 10/2006 | Se |
| 2006/0231301 A1 | 10/2006 | Rose |
| 2006/0235570 A1 | 10/2006 | Jung |
| 2006/0241827 A1 | 10/2006 | Fukuchi |
| 2006/0244588 A1 | 11/2006 | Hannah |
| 2006/0279421 A1 | 12/2006 | French |
| 2006/0293810 A1 | 12/2006 | Nakamoto |
| 2007/0005179 A1 | 1/2007 | Mccrackin |
| 2007/0017855 A1 | 1/2007 | Pippin |
| 2007/0045018 A1 | 3/2007 | Carter |
| 2007/0061210 A1 | 3/2007 | Chen |
| 2007/0069014 A1 | 3/2007 | Heckel |
| 2007/0072662 A1 | 3/2007 | Templeman |
| 2007/0085682 A1 | 4/2007 | Murofushi |
| 2007/0112461 A1 | 5/2007 | Zini |
| 2007/0125727 A1 | 6/2007 | Winkler |
| 2007/0150368 A1 | 6/2007 | Arora |
| 2007/0152057 A1 | 7/2007 | Cato |
| 2007/0222679 A1 | 9/2007 | Morris |
| 2007/0269177 A1 | 11/2007 | Braiman |
| 2007/0269299 A1 | 11/2007 | Ross |
| 2007/0284442 A1 | 12/2007 | Herskovitz |
| 2007/0288123 A1 | 12/2007 | D Andrea |
| 2007/0288127 A1 | 12/2007 | Haq |
| 2007/0293978 A1 | 12/2007 | Wurman |
| 2008/0011836 A1 | 1/2008 | Adema |
| 2008/0031491 A1 | 2/2008 | Ma |
| 2008/0041644 A1 | 2/2008 | Tudek |

(56) References Cited

U.S. PATENT DOCUMENTS

| | | |
|---|---|---|
| 2008/0042836 A1 | 2/2008 | Christopher |
| 2008/0075566 A1 | 3/2008 | Benedict |
| 2008/0075568 A1 | 3/2008 | Benedict |
| 2008/0075569 A1 | 3/2008 | Benedict |
| 2008/0077511 A1 | 3/2008 | Zimmerman |
| 2008/0105445 A1 | 5/2008 | Dayton |
| 2008/0131255 A1 | 6/2008 | Hessler |
| 2008/0140253 A1 | 6/2008 | Brown |
| 2008/0154720 A1 | 6/2008 | Gounares |
| 2008/0201227 A1 | 8/2008 | Bakewell |
| 2008/0226129 A1 | 9/2008 | Kundu |
| 2008/0228600 A1 | 9/2008 | Treyz |
| 2008/0243301 A1 | 10/2008 | Lanigan |
| 2008/0267759 A1 | 10/2008 | Morency |
| 2008/0281515 A1 | 11/2008 | Ann |
| 2008/0281664 A1 | 11/2008 | Campbell |
| 2008/0292439 A1 | 11/2008 | Dunkel |
| 2008/0294288 A1 | 11/2008 | Yamauchi |
| 2008/0306787 A1 | 12/2008 | Hamilton |
| 2008/0308630 A1 | 12/2008 | Bhogal |
| 2008/0314667 A1 | 12/2008 | Hannah |
| 2009/0074545 A1 | 3/2009 | Lert |
| 2009/0132250 A1 | 5/2009 | Chiang |
| 2009/0134572 A1 | 5/2009 | Obuchi |
| 2009/0138375 A1 | 5/2009 | Schwartz |
| 2009/0154708 A1 | 6/2009 | Kolar Sunder |
| 2009/0155033 A1 | 6/2009 | Olsen |
| 2009/0164902 A1 | 6/2009 | Cohen |
| 2009/0177323 A1 | 7/2009 | Ziegler |
| 2009/0210536 A1 | 8/2009 | Allen |
| 2009/0240571 A1 | 9/2009 | Bonner |
| 2009/0259571 A1 | 10/2009 | Ebling |
| 2009/0265193 A1 | 10/2009 | Collins |
| 2009/0269173 A1 | 10/2009 | De Leo |
| 2009/0299822 A1 | 12/2009 | Harari |
| 2009/0319399 A1 | 12/2009 | Resta |
| 2010/0025964 A1 | 2/2010 | Fisk |
| 2010/0030417 A1 | 2/2010 | Fang |
| 2010/0076959 A1 | 3/2010 | Ramani |
| 2010/0131103 A1 | 5/2010 | Herzog |
| 2010/0138281 A1 | 6/2010 | Zhang |
| 2010/0143089 A1 | 6/2010 | Hvass |
| 2010/0171826 A1 | 7/2010 | Hamilton |
| 2010/0176922 A1 | 7/2010 | Schwab |
| 2010/0211441 A1 | 8/2010 | Sprigg |
| 2010/0222925 A1 | 9/2010 | Anezaki |
| 2010/0262278 A1 | 10/2010 | Winkler |
| 2010/0268697 A1 | 10/2010 | Karlsson |
| 2010/0295847 A1 | 11/2010 | Titus |
| 2010/0299065 A1 | 11/2010 | Mays |
| 2010/0302102 A1 | 12/2010 | Desai |
| 2010/0316470 A1 | 12/2010 | Lert |
| 2010/0324773 A1 | 12/2010 | Choi |
| 2011/0010023 A1 | 1/2011 | Kunzig |
| 2011/0022201 A1 | 1/2011 | Reumerman |
| 2011/0055103 A1 | 3/2011 | Swafford, Jr. |
| 2011/0098920 A1 | 4/2011 | Chuang |
| 2011/0153081 A1 | 6/2011 | Romanov |
| 2011/0163160 A1 | 7/2011 | Zini |
| 2011/0176803 A1 | 7/2011 | Song |
| 2011/0225071 A1 | 9/2011 | Sano |
| 2011/0238211 A1 | 9/2011 | Shirado |
| 2011/0240777 A1 | 10/2011 | Johns |
| 2011/0258060 A1 | 10/2011 | Sweeney |
| 2011/0260865 A1 | 10/2011 | Bergman |
| 2011/0279252 A1 | 11/2011 | Carter |
| 2011/0288682 A1 | 11/2011 | Pinter |
| 2011/0288684 A1 | 11/2011 | Farlow |
| 2011/0288763 A1 | 11/2011 | Hui |
| 2011/0295424 A1 | 12/2011 | Johnson |
| 2011/0301757 A1 | 12/2011 | Jones |
| 2011/0320034 A1 | 12/2011 | Dearlove |
| 2011/0320322 A1 | 12/2011 | Roslak |
| 2012/0000024 A1 | 1/2012 | Layton |
| 2012/0029697 A1* | 2/2012 | Ota et al. ............ B62B 5/0006 701/26 |
| 2012/0035823 A1 | 2/2012 | Carter |
| 2012/0046998 A1 | 2/2012 | Staib |
| 2012/0059743 A1 | 3/2012 | Rao |
| 2012/0072303 A1 | 3/2012 | Brown |
| 2012/0134771 A1 | 5/2012 | Larson |
| 2012/0143726 A1 | 6/2012 | Chirnomas |
| 2012/0166241 A1 | 6/2012 | Livingston |
| 2012/0185094 A1 | 7/2012 | Rosenstein |
| 2012/0185355 A1 | 7/2012 | Kilroy |
| 2012/0192260 A1 | 7/2012 | Kontsevich |
| 2012/0197431 A1 | 8/2012 | Toebes |
| 2012/0203661 A1 | 8/2012 | Baharloo |
| 2012/0226556 A1 | 9/2012 | Itagaki |
| 2012/0239224 A1 | 9/2012 | McCabe |
| 2012/0255810 A1 | 10/2012 | Yang |
| 2012/0259732 A1 | 10/2012 | Sasankan |
| 2012/0272500 A1 | 11/2012 | Reuteler |
| 2012/0294698 A1 | 11/2012 | Villamar |
| 2012/0303263 A1 | 11/2012 | Alam |
| 2012/0303479 A1 | 11/2012 | Derks |
| 2012/0330458 A1 | 12/2012 | Weiss |
| 2013/0016011 A1 | 1/2013 | Harriman |
| 2013/0026224 A1 | 1/2013 | Ganick |
| 2013/0051667 A1 | 2/2013 | Deng |
| 2013/0054052 A1 | 2/2013 | Waltz |
| 2013/0054280 A1 | 2/2013 | Moshfeghi |
| 2013/0060461 A1 | 3/2013 | Wong |
| 2013/0073405 A1 | 3/2013 | Ariyibi |
| 2013/0076726 A1 | 3/2013 | Ferrara |
| 2013/0080289 A1 | 3/2013 | Roy |
| 2013/0096735 A1 | 4/2013 | Byford |
| 2013/0103539 A1 | 4/2013 | Abraham |
| 2013/0105036 A1 | 5/2013 | Smith |
| 2013/0110671 A1 | 5/2013 | Gray |
| 2013/0141555 A1 | 6/2013 | Ganick |
| 2013/0144595 A1 | 6/2013 | Lord |
| 2013/0145572 A1 | 6/2013 | Schregardus |
| 2013/0151335 A1 | 6/2013 | Avadhanam |
| 2013/0155058 A1 | 6/2013 | Golparvar-Fard |
| 2013/0173049 A1 | 7/2013 | Brunner |
| 2013/0174371 A1 | 7/2013 | Jones |
| 2013/0181370 A1 | 7/2013 | Rafie |
| 2013/0211953 A1 | 8/2013 | Abraham |
| 2013/0218453 A1 | 8/2013 | Geelen |
| 2013/0231779 A1 | 9/2013 | Purkayastha |
| 2013/0235206 A1 | 9/2013 | Smith |
| 2013/0238130 A1 | 9/2013 | Dorschel |
| 2013/0245810 A1 | 9/2013 | Sullivan |
| 2013/0254304 A1 | 9/2013 | Van Ness |
| 2013/0276004 A1 | 10/2013 | Boncyk |
| 2013/0300729 A1 | 11/2013 | Grimaud |
| 2013/0302132 A1 | 11/2013 | DAndrea |
| 2013/0309637 A1 | 11/2013 | Minvielle |
| 2013/0317642 A1 | 11/2013 | Asaria |
| 2013/0333961 A1 | 12/2013 | ODonnell |
| 2013/0338825 A1 | 12/2013 | Cantor |
| 2014/0006229 A1 | 1/2014 | Birch |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1 | 4/2014 | Wurman |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1 | 5/2014 | Huntzicker |
| 2014/0133943 A1 | 5/2014 | Razumov |
| 2014/0135984 A1 | 5/2014 | Hirata |

(56) References Cited

U.S. PATENT DOCUMENTS

| | | |
|---|---|---|
| 2014/0136414 A1 | 5/2014 | Abhyanker |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |
| 2014/0172197 A1 | 6/2014 | Ganz |
| 2014/0172727 A1 | 6/2014 | Abhyanker |
| 2014/0177907 A1 | 6/2014 | Argue |
| 2014/0177924 A1 | 6/2014 | Argue |
| 2014/0180478 A1 | 6/2014 | Letsky |
| 2014/0180528 A1 | 6/2014 | Argue |
| 2014/0180865 A1 | 6/2014 | Argue |
| 2014/0180914 A1 | 6/2014 | Abhyanker |
| 2014/0201041 A1 | 7/2014 | Meyer |
| 2014/0207614 A1 | 7/2014 | Ramaswamy |
| 2014/0209514 A1 | 7/2014 | Gitschel |
| 2014/0211988 A1 | 7/2014 | Fan |
| 2014/0214205 A1 | 7/2014 | Kwon |
| 2014/0217242 A1 | 8/2014 | Muren |
| 2014/0228999 A1 | 8/2014 | D'Andrea |
| 2014/0229320 A1 | 8/2014 | Mohammed |
| 2014/0244026 A1 | 8/2014 | Neiser |
| 2014/0244207 A1 | 8/2014 | Hicks |
| 2014/0246257 A1 | 9/2014 | Jacobsen |
| 2014/0247116 A1 | 9/2014 | Davidson |
| 2014/0250613 A1 | 9/2014 | Jones |
| 2014/0254896 A1 | 9/2014 | Zhou |
| 2014/0257928 A1 | 9/2014 | Chen |
| 2014/0258854 A1 | 9/2014 | Li |
| 2014/0266616 A1 | 9/2014 | Jones |
| 2014/0267409 A1 | 9/2014 | Fein |
| 2014/0274309 A1 | 9/2014 | Nguyen |
| 2014/0277693 A1 | 9/2014 | Naylor |
| 2014/0277742 A1 | 9/2014 | Wells |
| 2014/0277841 A1 | 9/2014 | Klicpera |
| 2014/0285134 A1 | 9/2014 | Kim |
| 2014/0289009 A1 | 9/2014 | Campbell |
| 2014/0297090 A1 | 10/2014 | Ichinose |
| 2014/0304107 A1 | 10/2014 | McAllister |
| 2014/0306654 A1 | 10/2014 | Partovi |
| 2014/0309809 A1 | 10/2014 | Dixon |
| 2014/0330456 A1 | 11/2014 | LopezMorales |
| 2014/0330677 A1 | 11/2014 | Boncyk |
| 2014/0344011 A1 | 11/2014 | Dogin |
| 2014/0344118 A1 | 11/2014 | Parpia |
| 2014/0350725 A1 | 11/2014 | LaFary |
| 2014/0350851 A1 | 11/2014 | Carter |
| 2014/0350855 A1 | 11/2014 | Vishnuvajhala |
| 2014/0361077 A1 | 12/2014 | Davidson |
| 2014/0369558 A1 | 12/2014 | Holz |
| 2014/0371912 A1 | 12/2014 | Passot |
| 2014/0379588 A1 | 12/2014 | Gates |
| 2015/0006319 A1 | 1/2015 | Thomas |
| 2015/0029339 A1 | 1/2015 | Kobres |
| 2015/0032252 A1 | 1/2015 | Galluzzo |
| 2015/0045992 A1 | 2/2015 | Ashby |
| 2015/0046299 A1 | 2/2015 | Yan |
| 2015/0066283 A1 | 3/2015 | Wurman |
| 2015/0070170 A1 | 3/2015 | Margalit |
| 2015/0073589 A1 | 3/2015 | Khodl |
| 2015/0088310 A1 | 3/2015 | Pinter |
| 2015/0088703 A1 | 3/2015 | Yan |
| 2015/0098775 A1 | 4/2015 | Razumov |
| 2015/0100439 A1 | 4/2015 | Lu |
| 2015/0100461 A1 | 4/2015 | Baryakar |
| 2015/0112826 A1 | 4/2015 | Crutchfield |
| 2015/0120094 A1 | 4/2015 | Kimchi |
| 2015/0123973 A1 | 5/2015 | Larsen |
| 2015/0134403 A1 | 5/2015 | Schwartz |
| 2015/0142249 A1 | 5/2015 | Ooga |
| 2015/0203140 A1 | 7/2015 | Holtan |
| 2015/0205298 A1 | 7/2015 | Stoschek |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0228004 A1 | 8/2015 | Bednarek |
| 2015/0229906 A1 | 8/2015 | Inacio De Matos |
| 2015/0231873 A1 | 8/2015 | Okamoto |
| 2015/0277440 A1 | 10/2015 | Kimchi |
| 2015/0278889 A1 | 10/2015 | Qian |
| 2015/0325128 A1 | 11/2015 | Lord |
| 2015/0336668 A1 | 11/2015 | Pasko |
| 2015/0360865 A1 | 12/2015 | Massey |
| 2015/0379468 A1 | 12/2015 | Harvey |
| 2016/0016731 A1 | 1/2016 | Razumov |
| 2016/0023675 A1 | 1/2016 | Hannah |
| 2016/0052139 A1 | 2/2016 | Hyde |
| 2016/0101794 A1 | 4/2016 | Fowler |
| 2016/0101936 A1 | 4/2016 | Chamberlin |
| 2016/0101940 A1 | 4/2016 | Grinnell |
| 2016/0110701 A1 | 4/2016 | Herring |
| 2016/0114488 A1 | 4/2016 | Mascorro Medina |
| 2016/0158635 A1 | 6/2016 | Aders |
| 2016/0165988 A1 | 6/2016 | Glasgow |
| 2016/0167557 A1 | 6/2016 | Mecklinger |
| 2016/0167577 A1 | 6/2016 | Simmons |
| 2016/0176638 A1 | 6/2016 | Toebes |
| 2016/0196755 A1 | 7/2016 | Navot |
| 2016/0207193 A1 | 7/2016 | Wise |
| 2016/0210602 A1 | 7/2016 | Siddique |
| 2016/0236867 A1 | 8/2016 | Brazeau |
| 2016/0255969 A1 | 9/2016 | High |
| 2016/0257212 A1 | 9/2016 | Thompson |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1 | 9/2016 | High |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1 | 9/2016 | Stubbs |
| 2016/0288601 A1 | 10/2016 | Gehrke |
| 2016/0288687 A1 | 10/2016 | Scherle |
| 2016/0297610 A1 | 10/2016 | Grosse |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1 | 12/2016 | Mohr |
| 2016/0355337 A1 | 12/2016 | Lert |
| 2016/0364732 A1 | 12/2016 | Jagatheesan |
| 2016/0364785 A1 | 12/2016 | Wankhede |
| 2016/0364786 A1 | 12/2016 | Wankhede |
| 2017/0009417 A1 | 1/2017 | High |
| 2017/0010608 A1 | 1/2017 | High |
| 2017/0010609 A1 | 1/2017 | High |
| 2017/0010610 A1 | 1/2017 | Atchley |
| 2017/0020354 A1 | 1/2017 | High |
| 2017/0024806 A1 | 1/2017 | High |
| 2017/0079202 A1 | 3/2017 | Balutis |
| 2017/0080846 A1 | 3/2017 | Lord |
| 2017/0101120 A1 | 4/2017 | Hannah |
| 2017/0107055 A1 | 4/2017 | Magens |

(56) References Cited

U.S. PATENT DOCUMENTS

| | | | |
|---|---|---|---|
| 2017/0110017 A1 | 4/2017 | Kimchi |
| 2017/0120443 A1 | 5/2017 | Kang |
| 2017/0129602 A1 | 5/2017 | Alduaiji |
| 2017/0137235 A1 | 5/2017 | Thompson |
| 2017/0148075 A1 | 5/2017 | High |
| 2017/0158430 A1 | 6/2017 | Raizer |
| 2017/0166399 A1 | 6/2017 | Stubbs |
| 2017/0176986 A1 | 6/2017 | High |
| 2017/0178066 A1 | 6/2017 | High |
| 2017/0178082 A1 | 6/2017 | High |
| 2017/0183159 A1 | 6/2017 | Weiss |
| 2017/0193434 A1 | 7/2017 | Shah |
| 2017/0283171 A1 | 10/2017 | High |
| 2017/0300759 A1 | 10/2017 | Beard |
| 2017/0318446 A1 | 11/2017 | Lee |
| 2017/0355081 A1 | 12/2017 | Fisher |
| 2018/0009108 A1 | 1/2018 | Yamamoto |
| 2018/0020896 A1 | 1/2018 | High |
| 2018/0068357 A1 | 3/2018 | High |
| 2018/0075403 A1 | 3/2018 | Mascorro Medina |
| 2018/0099846 A1 | 4/2018 | High |
| 2018/0170730 A1 | 6/2018 | High |
| 2018/0273292 A1 | 9/2018 | High |
| 2018/0282139 A1 | 10/2018 | High |
| 2018/0346299 A1 | 12/2018 | High |
| 2018/0346300 A1 | 12/2018 | High |
| 2019/0002256 A1 | 1/2019 | High |
| 2019/0084814 A1 | 3/2019 | Thompson |
| 2019/0112171 A1 | 4/2019 | High |
| 2019/0119083 A1 | 4/2019 | High |
| 2019/0169005 A1 | 6/2019 | High |
| 2019/0185302 A1 | 6/2019 | McHale |
| 2019/0210849 A1 | 7/2019 | High |
| 2019/0218081 A1 | 7/2019 | High |
| 2019/0256334 A1 | 8/2019 | High |
| 2019/0263644 A1 | 8/2019 | Atchley |
| 2019/0284034 A1 | 9/2019 | High |
| 2019/0292030 A1 | 9/2019 | High |

FOREIGN PATENT DOCUMENTS

| | | | |
|---|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204054062 | 12/2014 |
| CN | 204309852 | 12/2014 |
| CN | 204331404 | 5/2015 |
| CN | 105460051 | 4/2016 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| EP | 2886020 | 6/2015 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |
| JP | H10129996 | 5/1998 |
| JP | 2003288396 | 10/2003 |
| JP | 2005350222 | 12/2005 |
| JP | 2009284944 | 12/2009 |
| JP | 2010105644 | 5/2010 |
| JP | 2010231470 | 10/2010 |
| KR | 20120100505 A | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |
| WO | 2005102875 | 11/2005 |
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 2014101714 | 7/2014 |
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2015155556 | 10/2015 |
| WO | 2016009423 | 1/2016 |
| WO | 2016015000 | 1/2016 |
| WO | 2016144765 | 9/2016 |

OTHER PUBLICATIONS

U.S. Appl. No. 15/061,025, filed Mar. 4, 2016, High.
U.S. Appl. No. 15/061,054, filed Mar. 4, 2016, Kay.
U.S. Appl. No. 15/061,203, filed Mar. 4, 2016, High.
U.S. Appl. No. 15/061,265, filed Mar. 4, 2016, High.
U.S. Appl. No. 15/061,285, filed Mar. 4, 2016, High.
U.S. Appl. No. 15/061,325, filed Mar. 4, 2016, High.
U.S. Appl. No. 15/061,350, filed Mar. 4, 2016, Thompson.
U.S. Appl. No. 15/061,402, filed Mar. 4, 2016, High.
U.S. Appl. No. 15/061,406, filed Mar. 4, 2016, High.
U.S. Appl. No. 15/061,474, filed Mar. 4, 2016, High.
U.S. Appl. No. 15/061,507, filed Mar. 4, 2016, High.
U.S. Appl. No. 15/061,671, filed Mar. 4, 2016, High.
U.S. Appl. No. 15/061,677, filed Mar. 4, 2016, Taylor.
U.S. Appl. No. 15/061,686, filed Mar. 4, 2016, High.
U.S. Appl. No. 15/061,688, filed Mar. 4, 2016, Thompson.
U.S. Appl. No. 15/061,722, filed Mar. 4, 2016, High.

(56) References Cited

OTHER PUBLICATIONS

U.S. Appl. No. 15/061,770, filed Mar. 4, 2016, Atchley.
U.S. Appl. No. 15/061,792, filed Mar. 4, 2016, Winkle.
U.S. Appl. No. 15/061,801, filed Mar. 4, 2016, High.
U.S. Appl. No. 15/061,805, filed Mar. 4, 2016, Atchley.
U.S. Appl. No. 15/061,844, filed Mar. 4, 2016, High.
U.S. Appl. No. 15/061,848, filed Mar. 4, 2016, McHale.
U.S. Appl. No. 15/061,908, filed Mar. 4, 2016, High.
U.S. Appl. No. 15/061,980, filed Mar. 4, 2016, Thompson.
Abbrobotics; "ABB Robotics—Innovative Packaging Solutions", https://www.youtube.com/watch?v=e5jif-IUvHY, published on May 16, 2013. pp. 1-5.
Ang, Fitzwatler, et al.; "Automated Waste Sorter With Mobile Robot Delivery Waste System", De La Salle University Research Congress 2013, Mar. 7-9, 2013, pp, 1-7.
Ansari, Sameer, et al.; "Automated Trash Collection & Removal in Office Cubicle Environments", Squad Collaborative Robots, Sep. 27, 2013, pp, 1-23.
Armstrong, Jean, et al.; "Visible Light Positioning: A Roadmap for International Standardization", IEEE Communications Magazine, Dec. 2013, pp. 2-7.
Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.
Atherton, Kelsey D.; "New GPS Receiver Offers Navigation Accurate to an Inch", Popular Science, www.popsci.com/technology/article/2013-08/global-positioning-down-inches, Aug. 16, 2013, pp. 1-2.
Avezbadalov, Ariel, et al.: "Snow Shoveling Robot", engineering.nyu.edu/mechatronics/projects/ME3484/2006/Snow Shoveling Robot/Mechatronics Snow Robot Presentation Update 12-19-06.pdf, 2006, pp. 1-24.
Bares, John, et al.; "Designing Crash-Survivable Unmanned Vehicles", AUVSI Symposium, Jul. 10, 2002, pp. 1-15.
Bohren; Jonathan et al.; "Towards Autonomous Robotic Butlers: Lessons Learned with the PR2", Willow Garage, May 9, 2011, pp. 1-8.
Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.
Budgee; "The Robotic Shopping Cart Budgee"; https://www.youtube.com/watch?v=2dYNdVPF4VM; published on Mar. 20, 2015; pp. 1-6.
Burns, Tom; "irobot roomba 780 review best robot vacuum floor cleaning robot review video demo", https://www.youtube.com/watch?v=MkwtlyVAaEY, published on Feb. 13, 2013, pp. 1-10.
Bytelight; "Scalable Indoor Location", http://www.bytelight.com/, Dec. 12, 2014, pp. 1-2.
Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.
Capel, Claudine: "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1. 2008, pp. 1-8.
Carnegie Mellon Univeristy; "AndyVision—The Future of Retail", https://www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot by Voice and Computer Commands", International Journal of Advanced Research in Computer and Communication Engineering, vol. 2, Issue 4, Apr. 2013, pp. 1-3.
CNET; "iRobot Braava 380t—No standing ovation for this robotic floor mop", https://www.youtube.com/watch?v=JAtCIxFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Davis, Jo; "The Future of Retail: In Store Now", Online Brands, http://onlinebrands.co.nz/587/future-retail-store-now/, Nov. 16, 2014, pp. 1-5.
Denso; "X-mobility", Oct. 10, 2014, pp. 1-2, including machine translation.
DHL; "Self-Driving Vehicles in Logistics: A DHL perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
Dronewatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #DysonRobot", https://www.youtube.com/watch?v=OadhulCDAjk, published on Sep. 4. 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com.business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, May 19, 2015, pp. 1-3.
Fellowrobots; "Oshbot Progress—Fellow Robots", https://vimeo.com/139532370, published Sep. 16, 2015, pp. 1-5.
Follow Inspiration; "wiiGO"; https://www.youtube.com/watch?v=dhHXIdpknC4; published on Jun. 16, 2015; pp. 1-7.
fora.tv; "A Day in the Life of a Kiva Robot", https://www.youtube.com/watch?v=6KRjuuEVEZs, published on May 11, 2011, pp. 1-11.
GAMMA2VIDEO; "FridayBeerBot.wmv", https://www.youtube.com/watch?v=KXXIIDYatxQ, published on Apr. 27, 2010, pp. 1-7.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al; "Report on evaluation of the robot trolley", CommRob IST-045441, Advanced Behaviour and High-Level Multimodal Communications with and among Robots, Jun. 14, 2010, pp. 10-67.

(56) References Cited

OTHER PUBLICATIONS

Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, pp. 2005-2012.
Habib, Maki K., "Real Time Mapping and Dynamic Navigation for Mobile Robots", International Journal of Advanced Robotic Systems, vol. 4, No. 3. 2007, pp. 323-338.
HRJ3 Productions; "Japanese Automatic Golf Cart", https://www.youtube.com/watch?v=8diWYtqb6C0, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=IWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's; Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasysterns.com/solutions/vertical-storage/, printed on Apr. 2, 2015, pp. 1-2.
Kiva Systems; "How Kiva Systems and Warehouse Management Systems Interact", 2010, pp. 1-12.
Kiva Systems; "Kiva replenishment is more productive and accurate than replenishing pick faces in traditional distribution operations", http//www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Kiva's warehouse automation system is the most powerful and flexible A . . . ", http://www.kivasystems.com/solutions/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.
Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Kumar, Swagat; "Robotics-as-a-Service; Transforming the Future of Retail", Tata Consultancy Services, http://www.tcs.com/resources/white_papers/Pages/Robotics-as-Service.aspx, printed on May 13, 2015, pp. 1-4.
Lejepekov, Fedor; "Yuki-taro. Snow recycle robot.", https://www.youtube.com/watch?v=gI2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-GO—The autonomous and self-driven shopping cart"; https://www.indiegogo.com/projects/wi-go-the-autonomous-and-self-driven-shopping-cart; printed on Feb. 27, 2015, pp. 1-16.
Meena, M., & Thilagavathi, P.; "Automatic Docking System with Recharging and Battery Replacement for Surveillance Robot", International Journal of Electronics and Computer Science Engineering, 2012, pp. 1148-1154.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
Neurobtv; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
Nishimura, S. et al.; "Development of Attachable Modules for Robotizing Daily Items: Person Following Shopping Cart Robot"; Proceedings of the 2007 IEEE International Conference on Robotics and Biornimetics (Sanya, China); Dec 15-18, 2007; pp. 1506-1511.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Onozato, Taishi et al.; "A Control System for the Robot Shopping Cart"; 2010 IRAST International Congress on Computer Applications and Computational Science (CACS 2010); 2010; pp. 907-910.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.srnartplanet.com/blog/smart-takes/smart-cart-follows-you-when-grocery-shopping/, Feb. 29, 2012, pp. 1-4.
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=oBHYwYIo1UE, published on Sep. 8, 2014, pp. 1-6.
Rodriguez, Ashley; "Meet Lowe's Newest Sales Associate—OSHbot, the Robot", Advertising Age, http://adage.corn/article/cmo-strategy/meet-lowe-s-newest-sales-associate-oshbot-robot/295591/, Oct. 28, 2014, pp. 1-8.
Scholz, J. et al.; "Cart Pushing with a Mobile Manipulation System; Towards Navigation with Moveable Objects"; Proceedings of the 2011 IEEE International Conference on Robotics and Automation (Shanghai, China); May 9-13, 2011; pp. 6115-6120.

(56) References Cited

OTHER PUBLICATIONS

Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robotonics/savione-the-butler-bot-service-for-hospitality-industry.html, Aug. 14, 2014, pp. 1-5.
SK Telecom Co.; "SK Telecom Launches Smart Cart Pilot Test in Korea"; http://www.sktelecom.com/en/press/press_detail.do?idx=971; Oct. 4, 2011; pp. 1-2.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57. No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the NEW Stewart Golf X9 Follow", https://www.youtube.com/watch?v=HHivFGtiuE, published on Apr. 9, 2014, pp. 1-9.
Sun, Eric; ""Smart Bin & Trash Route" system—RMIT 2012 Green Inventors Competition", http://www.youtube.com/watch?v=OrTA57alO0k, published on Nov. 14, 2012, pp. 1-8.
Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
Technion; "Autonomous Tracking Shopping Cart—Shopping Made Easy from Technion"; https://www.youtube.com/watch?v=pQcb9fofmXg; published on Nov. 23, 2014; pp. 1-10.
Universal Robotics; "Neocortex Enables Random Part Handling and Automated Assembly", http://www.universalrobotics.com/random-bin-picking, printed on Dec. 22, 2015, pp. 1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
Vasilescu, Iuliu, et al.; "Autonomous Modular Optical Underwater Robot (AMOUR) Design, Prototype and Feasibility Study", Apr. 18, 2005, pp. 1-7.
Vmecavacuumtech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USATODAY, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wikipedia; "Leeds Kirkgate Market"; https://en.wikipedia.org/wiki/Leeds_Kirkgate_Market; Retrieved on Apr. 5, 2017; 8 pages.
Wired; "High-Speed Robots Part 1: Meet BettyBot in "Human Exclusion Zone" Warehouses—The Window-WIRED", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_S0Kc, published on Jul. 12, 2012, pp. 1-7.
U.S. Appl. No. 15/061,443, filed Mar. 4, 2016, High.
U.S. Appl. No. 15/274,991, filed Jan. 12, 2017, Donald R. High.
U.S. Appl. No. 15/275,009, filed Sep. 23, 2016, Donald R. High.
U.S. Appl. No. 15/275,019, filed Sep. 23, 2016, Donald R. High.
U.S. Appl. No. 15/275,047, filed Sep. 23, 2016, Donald R. High.
U.S. Appl. No. 15/282,951, filed Sep. 30, 2016, Donald R. High.
U.S. Appl. No. 15/288,923, filed Oct. 7, 2016, Donald R. High.
U.S. Appl. No. 15/423,812, filed Feb. 3, 2017, Donald R. High.
U.S. Appl. No. 15/446,914, filed Mar. 1, 2017, Donald R. High.
U.S. Appl. No. 15/447,175, filed Mar. 2, 2017, Donald R. High.
U.S. Appl. No. 15/447,202, filed Mar. 2, 2017, Donald R. High.
U.S. Appl. No. 15/471,278 filed Mar. 28, 2017, Donald R. High.
U.S. Appl. No. 15/692,226, filed Aug. 31, 2017, Donald R. High.
U.S. Appl. No. 15/836,708, filed Dec. 8, 2017, Donald R. High.
Daily Mail; "Dancing with your phone: The gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Owano, Nancy; "HEARBO robot can tell beeps, notes, and spoken word (w/ Video)", Phys.org, Nov. 21, 2012, https://phys.org/news/2012-11-hearbo-robot-beeps-spoken-word.html, pp. 1-4.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/2016/4781280, pp. 1-16.
USPTO; U.S. Appl. No. 15/061,474; Notice of Allowance dated Oct. 24, 2017.
U.S. Appl. No. 15/894,155, filed Feb. 12, 2018, Donald R. High.
USPTO; U.S. Appl. No. 15/061,474; Office Action dated Jul. 7, 2017.
U.S. Appl. No. 16/191,192, filed Nov. 14, 2018, Thompson John P.
U.S. Appl. No. 16/216,147, filed Dec. 11, 2018, High Donald R.
U.S. Appl. No. 16/224,536, filed Dec. 18, 2018, High Donald R.
U.S. Appl. No. 16/269,262, filed Feb. 6, 2019, High Donald R.
U.S. Appl. No. 16/282,888, filed Feb. 22, 2019, Brian G. McHale.
U.S. Appl. No. 15/698,068, filed Sep. 7, 2017, Donald R. High.
U.S. Appl. No. 15/990,274, filed May 25, 2018, Donald R. High.
U.S. Appl. No. 16/001,774, filed Jun. 6, 2018, Donald R. High.
U.S. Appl. No. 16/059,431, filed Aug. 9, 2018, Donald R. High.
U.S. Appl. No. 16/100,064, filed Aug. 9, 2018, Donald R. High.
U.S. Appl. No. 16/109,290, filed Aug. 22, 2018, Donald R. High.
U.S. Appl. No. 16/361,015, filed Mar. 21, 2019, High, Donald R.
U.S. Appl. No. 16/399,854, filed Apr. 30, 2019, High, Donald R.
U.S. Appl. No. 16/408,335, filed May 9, 2019, Atchley, Michael D.
U.S. Appl. No. 16/434,816, filed Jun. 7, 2019, High, Donald R.
U.S. Appl. No. 16/442,134, filed Jun. 14, 2019, High, Donald R.
Emspak, Jesse; "Electric Trucks Plus Drones Could Make Deliveries 'Green'"; https://www.livescience.com/48510-delivery-drones-electric-trucks.html; Oct. 29, 2014; pp. 1-5.
Shandrow, Kim Lachance; "This shopping cart of the future creepily follows you around stores"; https://www.entrepreneur.com/article/241335; Dec. 31, 2014; pp. 1-13.
Workhorse Group; "HorseFly by Workhorse—Drone Delivery Concept"; https://www.youtube.com/watch?v=epqZ-luhzKQ; published on Oct. 13, 2015; pp. 1-8.
Workhorse; "HorseFly"; http://workhorse.com/aerospace; Feb. 2017; pp. 1-6.

(56) References Cited

OTHER PUBLICATIONS

Zito, Daniel; "Workhorse Group Obtains Section 333 Exemption From Federal Aviation Administration to Test HorseFly(TM) UAS;" https://web.archive.org/web/20160626120625/http://globenewswire.com:80/news-release/2015/12/09/794112/10158200/en/Workhorse-Group-Obtains-Section-333-Exemption-From-Federal-Aviation-Administration-to-Test-HorseFly-TM-UAS.html; published Dec. 9, 2015; pp. 1-3.

* cited by examiner

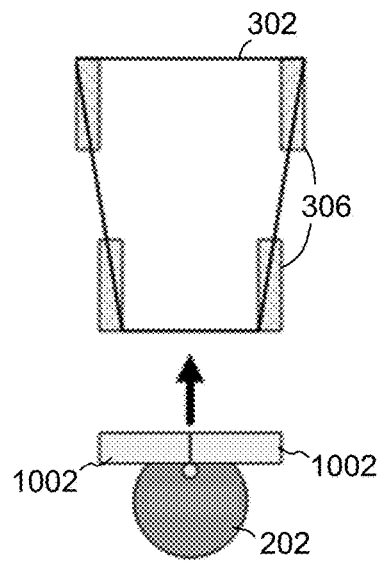 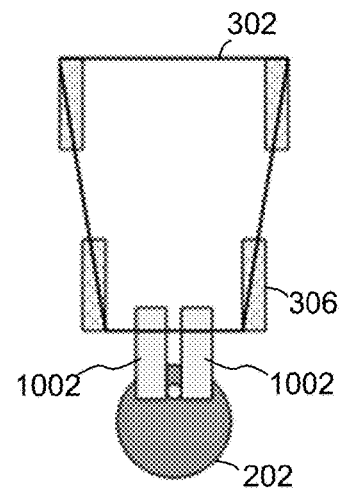 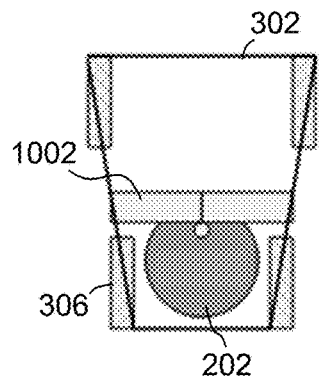
*FIG. 10A*  *FIG. 10B*  *FIG. 10C*
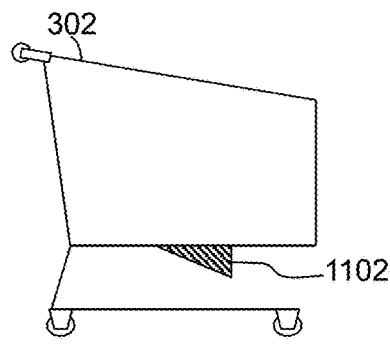 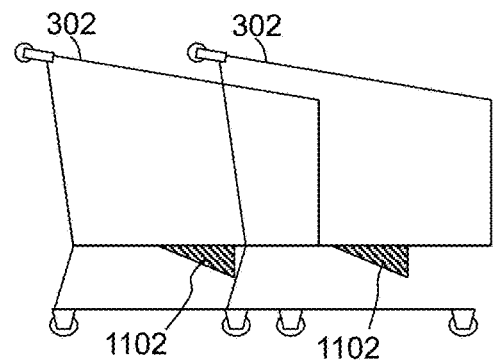
*FIG. 11A*  *FIG. 11B*

SHOPPING FACILITY ASSISTANCE SYSTEMS, DEVICES AND METHODS TO DRIVE MOVABLE ITEM CONTAINERS

RELATED APPLICATIONS

This application is a continuation of U.S. application Ser. No. 15/061,474, filed Mar. 4, 2016, which is incorporated herein by reference in its entirety, and which claims the benefit of each of the following U.S. Provisional applications, each of which is incorporated herein by reference in its entirety: U.S. Provisional Application No. 62/129,726, filed Mar. 6, 2015; U.S. Provisional Application No. 62/129,727, filed Mar. 6, 2015; U.S. Provisional Application No. 62/138,877, filed Mar. 26, 2015; U.S. Provisional Application No. 62/138,885, filed Mar. 26, 2015; U.S. Provisional Application No. 62/152,421, filed Apr. 24, 2015; U.S. Provisional Application No. 62/152,465, filed Apr. 24, 2015; U.S. Provisional Application No. 62/152,440, filed Apr. 24, 2015; U.S. Provisional Application No. 62/152,630, filed Apr. 24, 2015; U.S. Provisional Application No. 62/152,711, filed Apr. 24, 2015; U.S. Provisional Application No. 62/152,610, filed Apr. 24, 2015; U.S. Provisional Application No. 62/152,667, filed Apr. 24, 2015; U.S. Provisional Application No. 62/157,388, filed May 5, 2015; U.S. Provisional Application No. 62/165,579, filed May 22, 2015; U.S. Provisional Application No. 62/165,416, filed May 22, 2015; U.S. Provisional Application No. 62/165,586, filed May 22, 2015; U.S. Provisional Application No. 62/171,822, filed Jun. 5, 2015; U.S. Provisional Application No. 62/175,182, filed Jun. 12, 2015; U.S. Provisional Application No. 62/182,339, filed Jun. 19, 2015; U.S. Provisional Application No. 62/185,478, filed Jun. 26, 2015; U.S. Provisional Application No. 62/194,131, filed Jul. 17, 2015; U.S. Provisional Application No. 62/194,119, filed Jul. 17, 2015; U.S. Provisional Application No. 62/194,121, filed Jul. 17, 2015; U.S. Provisional Application No. 62/194,127, filed Jul. 17, 2015; U.S. Provisional Application No. 62/202,744, filed Aug. 7, 2015; U.S. Provisional Application No. 62/202,747, filed Aug. 7, 2015; U.S. Provisional Application No. 62/205,548, filed Aug. 14, 2015; U.S. Provisional Application No. 62/205,569, filed Aug. 14, 2015; U.S. Provisional Application No. 62/205,555, filed Aug. 14, 2015; U.S. Provisional Application No. 62/205,539, filed Aug. 14, 2015; U.S. Provisional Application No. 62/207,858, filed Aug. 20, 2015; U.S. Provisional Application No. 62/214,826, filed Sep. 4, 2015; U.S. Provisional Application No. 62/214,824, filed Sep. 4, 2015; U.S. Provisional Application No. 62/292,084, filed Feb. 5, 2016; U.S. Provisional Application No. 62/302,547, filed Mar. 2, 2016; U.S. Provisional Application No. 62/302,567, filed Mar. 2, 2016; U.S. Provisional Application No. 62/302,713, filed Mar. 2, 2016; and U.S. Provisional Application No. 62/303,021, filed Mar. 3, 2016.

TECHNICAL FIELD

These teachings relate generally to shopping environments and more particularly to devices, systems and methods for assisting customers and/or workers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, customers may submit customer orders for one or more products that can be time consuming to fulfill, and particularly during peak hours, there may not be enough employees available to assist customers. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein:

FIGS. 10A, 10B and 10C illustrate some embodiments of a motorized transport unit detachably engaging a movable item container embodied as a shopping cart;

FIG. 11A illustrates an exemplary movable item container, embodied as shopping carts, with a seating block, in accordance with some embodiments;

FIG. 11B illustrates some embodiments of two seated movable item containers, embodied as shopping carts.

Figure 1:
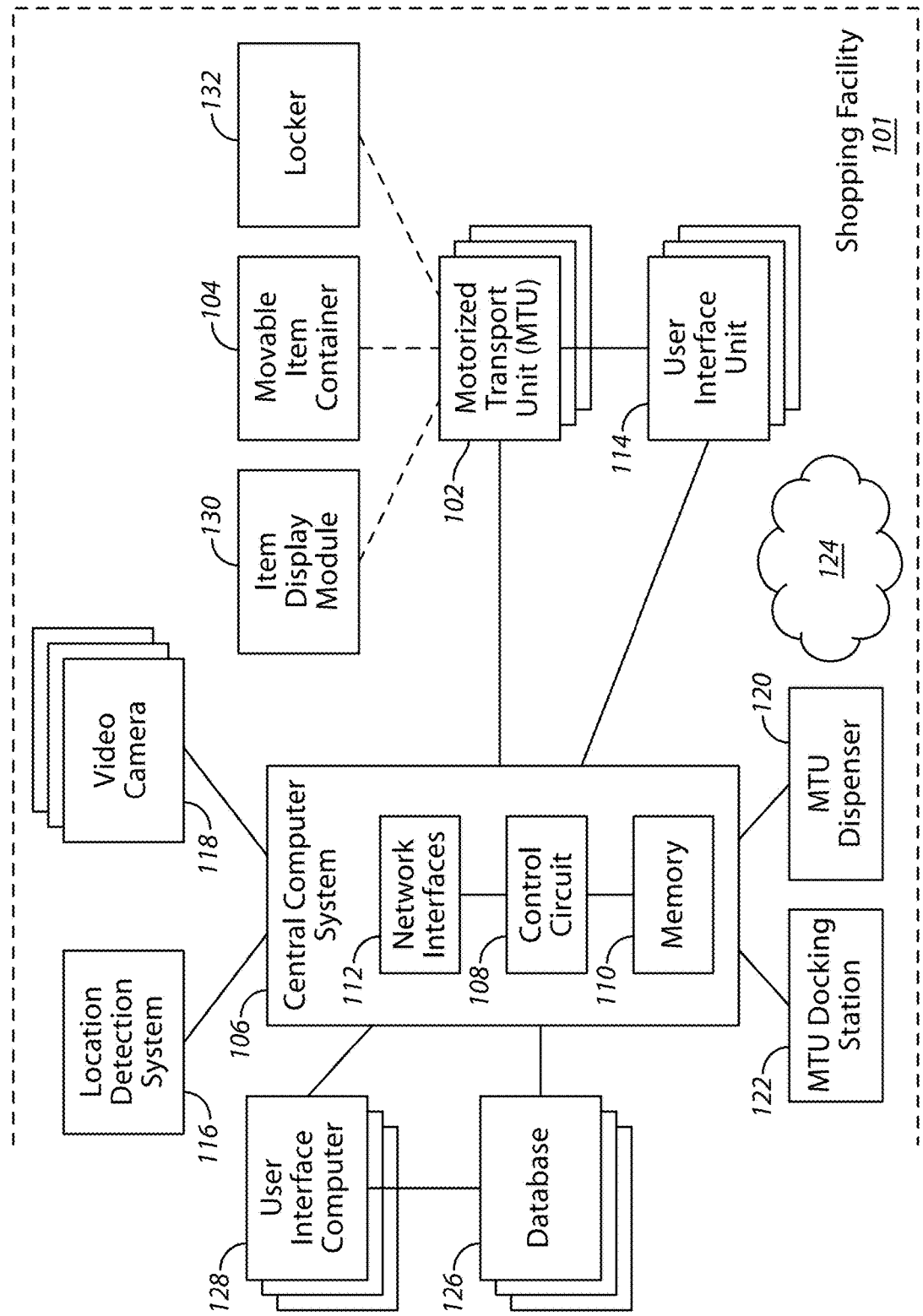
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations, parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the shopping area may include product storage units, shelves, racks, modules, bins, etc., and other walls, dividers, partitions, etc. that may be configured in different layouts or physical arrangements. In other examples, persons or other movable objects may be freely and independently traveling through the shopping facility space. And in other examples, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein. It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-11B expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, WI-FI, ZIGBEE or BLUETOOTH network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM))).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a WI-FI wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the BYTELIGHT system from BYTELIGHT of Boston, Mass. In embodiments using a BYTELIGHT system, a typical display screen of the typical smart phone device can be used as a light sensor or light receiver to receive and process data encoded into the light from the BYTELIGHT light sources.

In other embodiments, the location detection system 116 includes a series of low energy radio beacons (e.g., BLUETOOTH low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a BLUETOOTH low energy radio system, a typical BLUETOOTH radio of a typical smart phone device can be used as a receiver to receive and process data encoded into the BLUETOOTH low energy radio signals from the BLUETOOTH low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
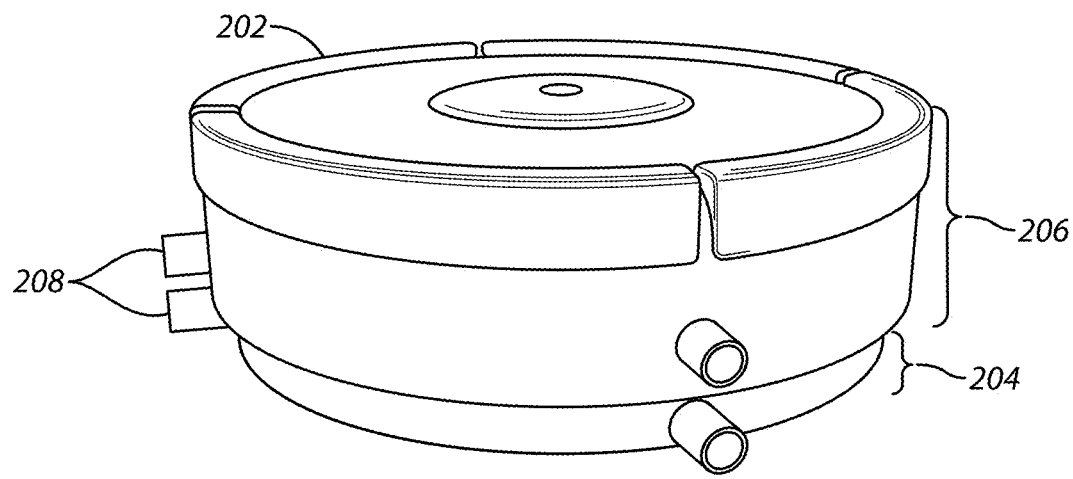
FIGS. 2A and 2B are illustrations of a motorized transport unit of the system of FIG. 1 in a retracted orientation and an extended orientation in accordance with some embodiments.
Figure 2B:
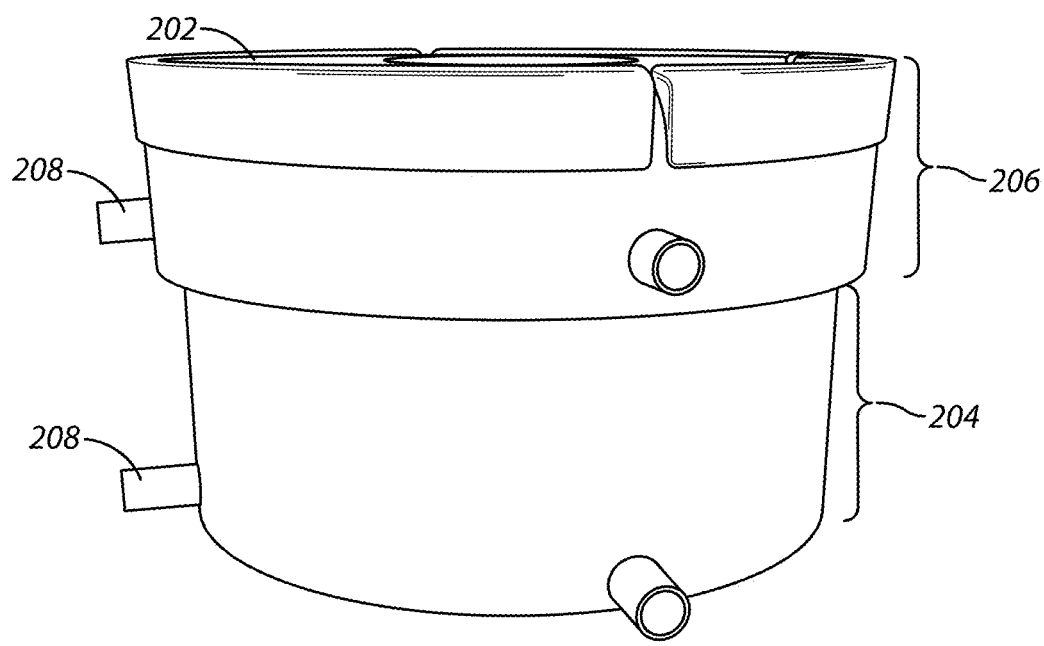

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204. That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3B:
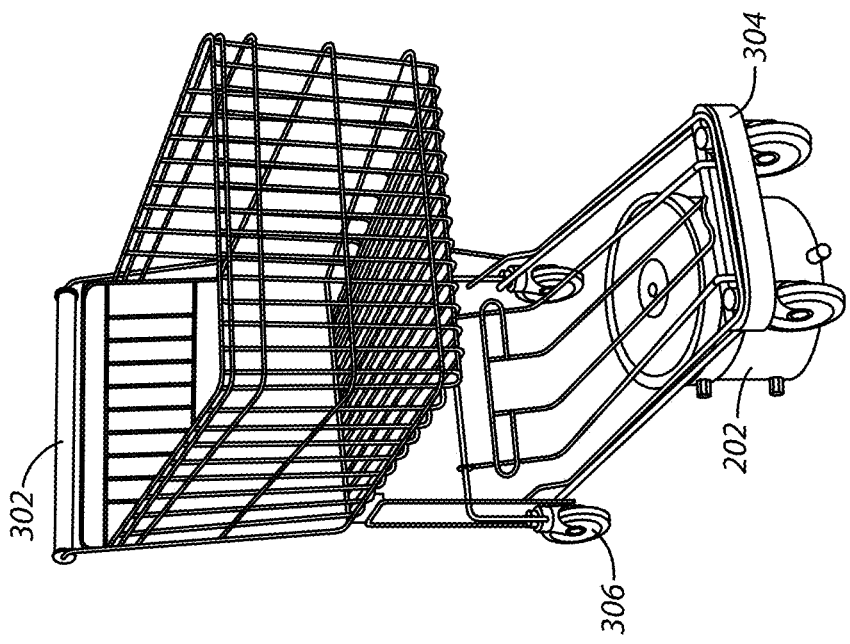
FIGS. 3A and 3B are illustrations of the motorized transport unit of FIGS. 2A and 2B detachably coupling to a movable item container, such as a shopping cart, in accordance with some embodiments.
Figure 3A:
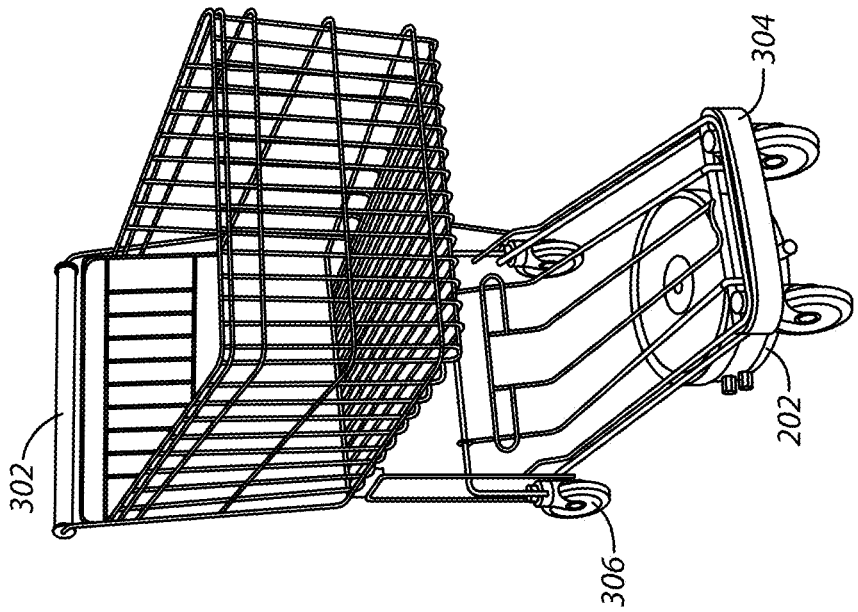

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
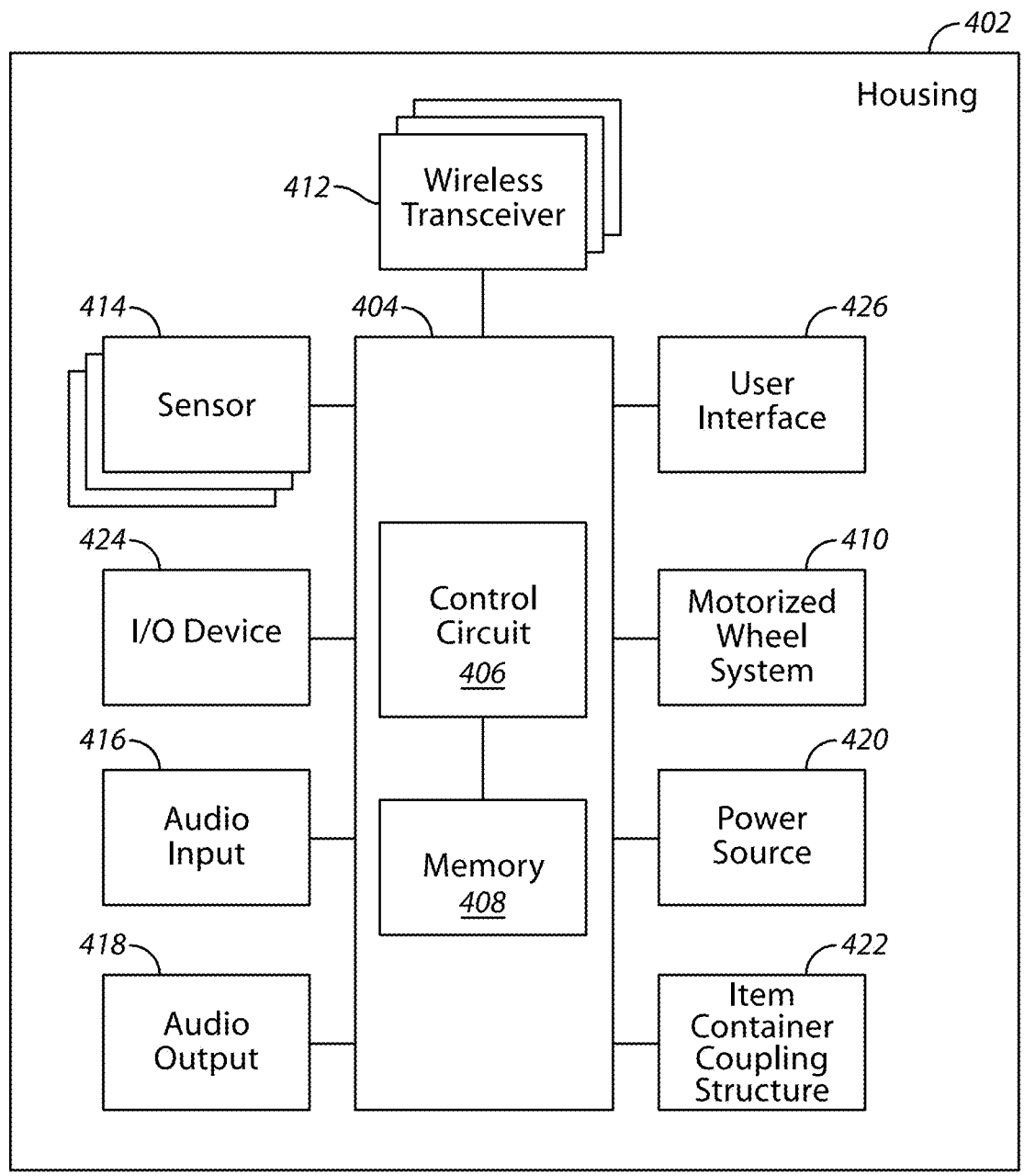
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a WI-FI-compatible and/or BLUETOOTH-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM))).)

It is noted that not all components illustrated in FIG. 4 are included in all embodiments of the motorized transport unit 102. That is, some components may be optional depending on the implementation.

Figure 5:
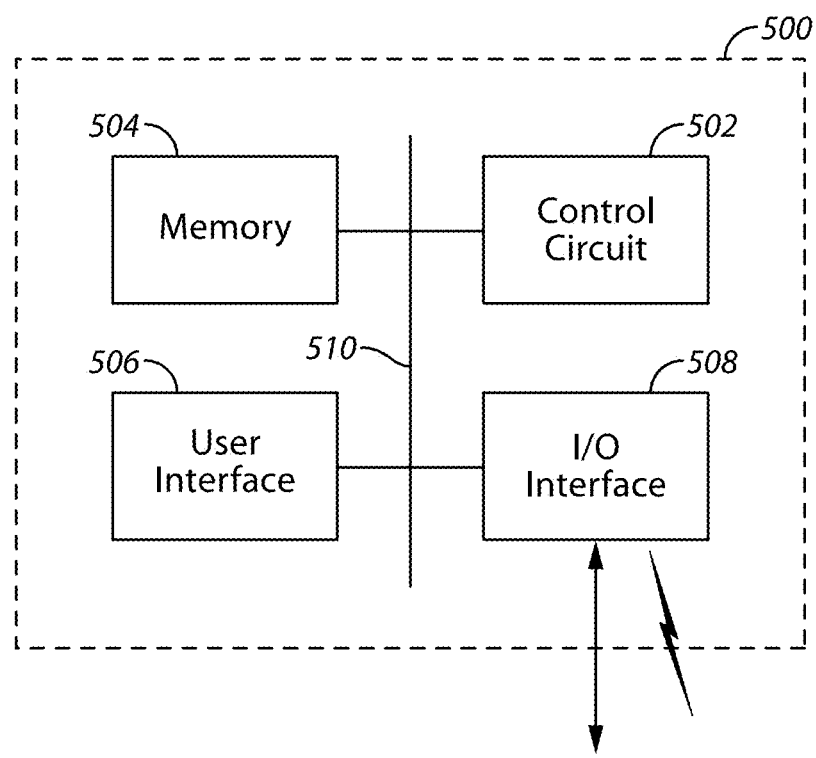
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the BYTELIGHT system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, BLUETOOTH low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold DIET COKE product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at a MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit is loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to use the system 100. In some embodiments, communications throughout the session are encrypted using Secure Sockets Layer (SSL) or other methods at transport level.

Further Details of Some Embodiments

In accordance with some embodiments, further details are now provided for one or more of these and other features. For example, generally speaking, pursuant to various embodiments, systems, apparatuses, processes and methods are provided herein that enable a motorized transport unit 102 to cooperate with a movable item container 104 and drive or otherwise move the item container through at least portions of the shopping facility, and in some instances outside of the shopping facility.

Referring back to FIGS. 3A-3B, in some embodiments, the motorized transport unit 202 is configured to cooperate with and lift at least a portion of the movable item container 104. The motorized transport unit 202 positions itself and/or receives routing information from the central computer system relative to the movable item container, and in some instances moves at least partially under the movable item container or an extended support with which the motorized transport unit can couple.

In some embodiments, the central computer system utilizes sensor data (e.g., video camera information, RFID information of a movable item container, one or more radio beacons (e.g., WI-FI, BLUETOOTH, RF, etc.) at known positions throughout the shopping facility, light sources (e.g., LEDs) that emit identifier information, location identifiers (e.g., barcodes), and the like) to identify a location of a movable item container and/or one or more motorized transport units. The location information may be received directly from a detector, from one or more sensors on the movable item container, sensor data from one or more motorized transport units, other sources, or combination of such sources. Based on the detected location of the movable item container and a motorized transport unit, the central computer system can route a motorized transport unit to the location of the movable item container.

Once proximate the movable item container, the motorized transport unit then moves to a predefined location and/or orientation relative to the movable item container where the motorized transport unit can lift at least a portion of the movable item contain. In some instances, the central computer system continues to track sensor data and communicates routing information to the motorized transport unit to cause the motorized transport unit to move to the predefined location. Additionally or alternatively, the motorized transport unit may utilize its own internal sensors in positioning and/or orienting itself relative to the movable item container. For example, in some embodiments, the central computer system routes the motorized transport unit to a location proximate the movable item container. Once positioned proximate the movable item container, the motorized transport unit autonomously moves itself into position, based on sensor data (e.g., distance measurement sensor/s, camera/s, image processing, RFID scanner/s, barcode reader/s, light ID detector/s, antenna/s, directional antenna/s, other such sensors, or typically a combination of two or more of such sensors and/or sensor data). Furthermore, the central computer system may communicate sensor data to the motorized transport unit that can be used by the motorized transport unit in addition to local sensor data in orienting and positioning itself relative to the movable item container.

Figure 6:
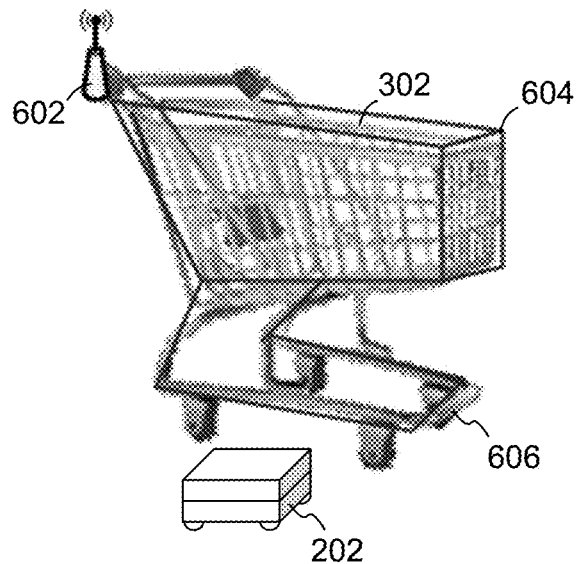
FIG. 6 illustrates some embodiments of a motorized transport unit positioned proximate a movable item container.

FIG. 6 illustrates some embodiments of a motorized transport unit 202 positioned proximate a movable item container. The movable item container may include an RFID transmitter 602 or other such transmitter that can be detected by the motorized transport unit and/or the central computer system to obtain an identifier of the movable item container, and/or may be used in part to determine a location of the movable item container. Utilizing one or more sensors (e.g., camera/s, distance sensor/s, other such sensors, or a combination of two or more of such sensors), the motorized transport unit, once positioned proximate the movable item container, may recognize a shape of the movable item container (e.g., a virtual modeled shape 604 that corresponds to a reference model) and based on the shape (e.g., a difference between the orientation of the detected modeled shape relative to a reference shape, such as differences in lengths, angles, etc.) can identify an orientation of the motorized transport unit relative to the movable item container. For example, the motorized transport unit can recognize the movable item container and its relative orientation based on angles and/or rotation of the model. Additionally or alternatively, some embodiments may recognize one or more key features of the movable item container. For example, the motorized transport unit may, based on the detected model, identify a frame 606, base, or the like, and/or a specific aspect of the frame (e.g., a front bar of the frame) and its orientation relative to that key feature.

Utilizing the determined relative position and/or orientation, the motorized transport unit can move itself into a desired position relative to the movable item container. Typically, during movement, the motorized transport unit can continue to use sensor data (e.g., distance measurements, video and/or image data, etc.) to continue to track its position relative to the movable item container and its orientation relative to a desired positioning and orientation relative to the movable item container to allow cooperation between the motorized transport unit and the movable item container.

Figure 7:
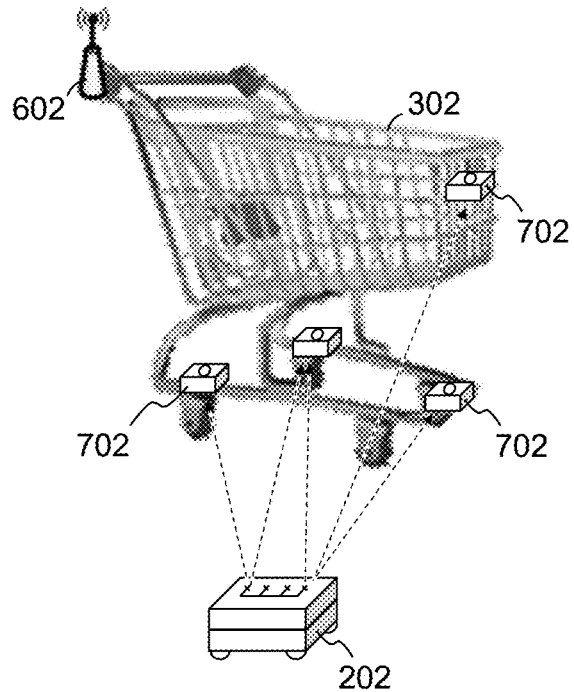
FIG. 7 illustrates some embodiments of a motorized transport unit positioned proximate a movable item container that includes one or more tags.

FIG. 7 illustrates some embodiments of a motorized transport unit 202 positioned proximate a movable item container 302 that includes one or more tags 702, beacons or the like (e.g., RFID tag, radio beacon, distance tags providing distance information, etc.) placed at predefined locations on the movable item container. The proximity depends on the signal strength of the tags, interference, and other such factors. Again, the central computer system may provide routing instructions to guide the motorized transport unit through one or more portions of the shopping facility to a location proximate the movable item container (e.g., within a predefined threshold distance where it has been determined the motorized transport unit can accurately detect the tags). In some embodiments, the motorized transport unit wirelessly receives positioning route instructions from the central computer system. Based on the route instructions, the control circuit of the motorized transport unit can activate the motorized wheel system to move the motorized transport unit through at least a portion of the shopping facility and to position the motorized transport unit, in accordance with the positioning route instructions, proximate the movable item container such that the one or more wireless tag sensors are capable of sensing at least one of the wireless tags on the item container.

The motorized transport unit can then utilize one or more sensors (e.g., camera/s, distance sensor/s, antenna/s, directional antenna/s, other such sensors, or a combination of two or more of such sensors) to detect and/or recognize the movable item container and/or determine a relative position and/or orientation of the movable item container relative to a position and/or orientation of the motorized transport unit. In some embodiments, the motorized transport unit utilizes one or more tag sensors, directional antennas or the like to detect and locate the one or more tags 702 (e.g., determine distance and angle of tags relative to a position and orientation of the motorized transport unit). Based on the predefined location of the tags on the movable item container, the motorized transport unit can use the determined location and orientation of the movable item container relative to the motorized transport unit as the motorized transport unit moves into a desired position relative to the movable item container so that the motorized transport unit can cooperate with and lift at least a portion of the movable item container. For example, based on the detected tags, the motorized transport unit can apply triangulation relative to the multiple tags to determine a precise location of the motorized transport unit relative to the movable item container.

Again, the location information determined from the tags may be utilized in combination with other sensor data, such as distance measurement data, image processing data and other such information. The number of tags can vary depending on one or more factors, such as but not limited to size of the movable item container, precision of the sensors of the motorized transport unit, input from the central computer system (e.g., movement and/or routing instructions, sensor data, etc.), and other such factors. In some implementations, for example, the movable item container may include three or more tags 702 that allow the motorized transport unit and/or the central computer system to determine positioning and/or orientation of the motorized transport unit relative to the movable item container as the motorized transport unit moved into a desired position. As a specific example, in some applications four tags are secured in predefined locations on the movable item container, where three tags can be used for horizontal positioning and/or orientation while the fourth can be used for vertical positioning. Typically, the tags have unique identifiers that allow the motorized transport unit and/or the central computer system to distinguish between the tags. In some implementations, the orientation is utilized to accurately orient the motorized transport unit relative to the movable item container, such as to accurately position one or more item container coupling structures 422.

Further, in some implementations, one or more sensors of the motorized transport unit may be overridden and/or ignored. For example, a bump sensor may be ignored as the motorized transport unit moves into position relative to the movable item container. Similarly, in some instances the motorized transport unit may intentionally bump one or more parts of the movable item container (e.g., the wheels) as part of a positioning process. As such, the bump sensor may be used not as a warning but as a confirmation.

Figure 8:
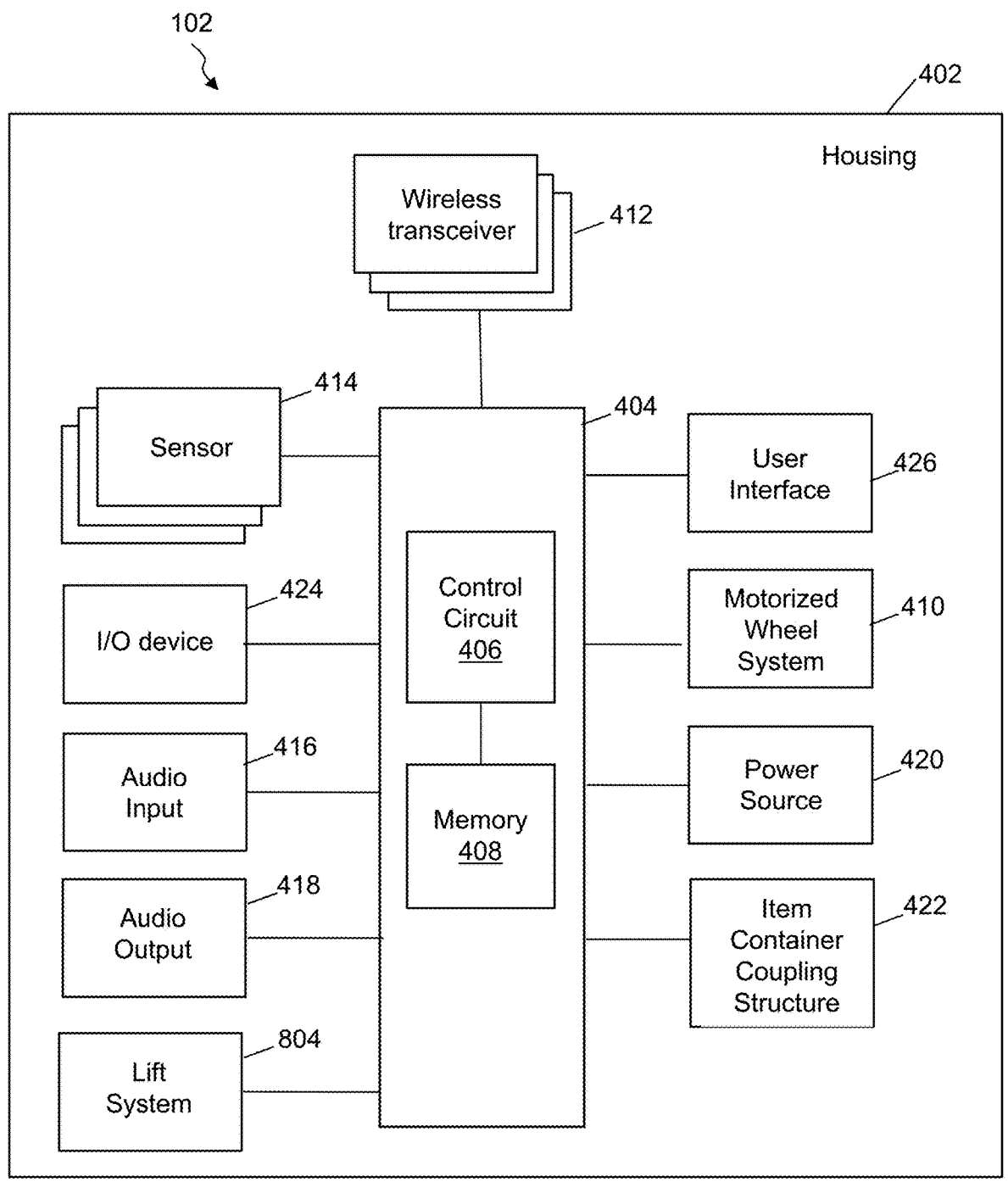
FIG. 8 illustrates an example of the motorized transport unit of FIG. 1, in accordance with some embodiments.

FIG. 8 illustrates an example of the motorized transport unit 102 of FIG. 1, in accordance with some embodiments. In this example, the motorized transport unit 102 has a housing 402 that contains (partially or fully) or at least supports and carries a number of components. These components can include a control unit 404 comprising a control circuit 406 that, like the control circuit 108 of the central computer system 106, controls the general operations of the motorized transport unit 102, and memory 408, and can include one or more of a motorized wheel system 410, wireless transceiver 412, on-board sensors 414, audio input 416, audio output 418, rechargeable power source 420, movable item container coupling structure 422, input/output (I/O) device 424, user interface 426, other such components, and typically a combination of two or more of such components.

As described above, the sensors 414 may include one or more wireless tag sensors, antennas and/or other such sensors to detect the tags 702 cooperated with movable item container. The tag sensors couple with the control circuit such that the control circuit receives from the one or more tag sensors location information. In some implementations, the tag location information, which is typically wirelessly detected from multiple different wireless tags positioned at different positions on the movable item container, can include and/or be used to determine location and/or orientation information of the tags 702 relative to a location of the motorized transport unit. This location information allows the control circuit 406 to identify a location and orientation of the item container relative to the motorized transport unit.

In some embodiments, the motorized transport unit further includes one or more lift systems 804. The lift system is configured to lift a portion of the motorized transport unit. For example, in some embodiments, the lift system is cooperated with the one or more item container coupling structures 422, which lift at least the one or more item container coupling structures. When the item container coupling structures are cooperated with the movable item container, the lifting can be transferred to the movable item container to cause at least a portion of the movable item container to be lifted. Additionally or alternatively, in some embodiments, the motorized transport unit includes a frame structure with at least two frame and/or housing sections that are movable relative to each other. The lift system can couple between the two frame sections such that when activated can cause the two frame sections to at least move toward or away from each other. The control circuit 406 controls the one or more lift systems 804. Typically, when the lift system is operated to move the frame sections toward each other the motorized transport unit is in a low profile or retracted state, and when operated to move the two frame sections away from each other the motorized transport unit is in high profile or extended state such that a height of at least a portion of the motorized transport unit is greater in the extended state than in the retracted state (e.g., see FIGS. 3A-3B).

In some embodiments, the control circuit activates the lift system to configure the motorized transport unit into the retracted state retracting the two frame sections. This can allow the control circuit to control the motorized wheel system to move the motorized transport unit in position underneath a portion of the movable item container. The motorized wheel system 410 can be activate and controlled while continuing to monitor location information (e.g., using distance sensor data, tag location data, image processing, information from the central computer system, and/or other such information) to position the motorized transport unit under the movable item container and aligned, based on the location information, relative to a frame of the movable item container.

Once the motorized transport unit is in position (e.g., using sensors, antennas, image processing, etc.), the control circuit can activate the one or more lift systems 804 to transition to the extended state to lift on the frame 606 of the movable item container lifting a first portion of the item container. In some embodiments, the lifting on the frame 606 lifts a portion of the movable item container such that one or more wheels 306 of the item container are lifted off of the floor while two or more other wheels 306 of the item container remain in contact with the floor. For example, a front portion 304 of the movable item container can be lifted off of the ground by the motorized transport unit, including lifting the front wheels off the ground. The back or rear wheels 306 of the movable item container can remain on the ground. In this orientation, the motorized transport unit 202 is able to drive the movable item container through the shopping facility. Again, in these embodiments, the motorized transport unit does not bear the weight of the entire movable item container since the rear wheels 306 rest on the floor. Further, the motorized transport unit takes advantage of the rear wheels continued contact with the floor to maintain an enhanced stability and reduces the potential of tipping. The control circuit is configured to activate the motorized wheel system, in accordance with shopping route instructions received from the central computer system, to drive the item container through the shopping facility along a shopping route while the two or more wheels of the item container continue to be in contact with the floor and supporting a portion of the weight of the item container and products placed into the item container. The lift force provided by the lift system can depend on expected weight and/or load of the movable item container and the weight of the products expected to be placed into the movable item container.

The lift system 804 can be configured with one or more lifting devices and/or systems. In some instances, the lift system includes a lift system control circuit that receives instructions from the motorized transport unit control circuit 406 and controls the one or more lifting devices. In other instances, the motorized transport unit control circuit directly controls the lifting devices. The lifting devices extend and retract the two frame and/or housing sections, one or more item container coupling structures 422, or other portion of the motorized transport unit that cooperates with the movable item container. The one or more lifting devices can include one or more hydraulic lifts, screw drives, servo-electric motors, linear servo-electric motors, or other such lifting devices or a combination of two or more of such lifting devices.

In some embodiments, the lift system comprises a plurality of hydraulic lifts that are spaced relative to each other and upon activation lift the one or more wheels 306 of the item container off of the floor. For example, the lift system may include four hydraulic lift devices, which may be positioned to correspond to each of one of the wheels of the motorized wheel system, and can be cooperatively or independently activated. The motorized transport unit can include a body or housing having a top portion and a bottom portion. In some implementations, the hydraulic lifts cooperate with at least the top portion such that when activated cause the top portion to lift relative to the bottom portion and lift the first portion of the item container.

Some applications cooperate the one or more hydraulic lift systems or other such lift systems with a track, rail, guide, groove, rod, or the like that allows a portion of the motorized transport unit (e.g., a lower portion) to rotate relative to another portion (e.g., upper portion). The lifting devices alternatively cooperated with hinges, pivots, gearing and/or other such features that allow at least some lateral movement. In other implementations, a one or more screw drives are utilized to provide the lifting force. For example, a single centrally positioned screw drive can be utilized that causes a lower portion of the motorized transport unit to spin relative to an upper portion of the motorized transport unit. Alternatively or additionally, the frame and/or housing may include an upper portion and a lower portion with cooperative threading allowing extension and retraction between the upper and lower portions as the lower portion rotates relative to the upper portion.

Figure 9:
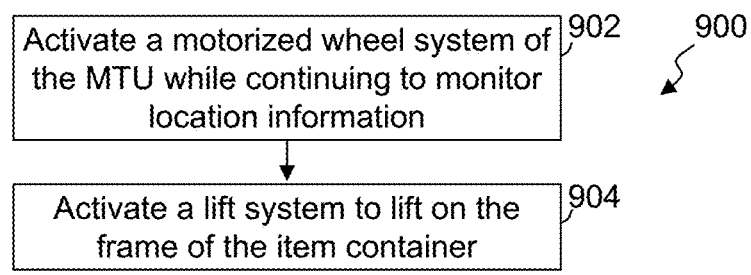
FIG. 9 illustrates a simplified flow diagram of an exemplary process of cooperating a motorized transport unit with a movable item contain such that the motorized transport unit can drive the movable item container through a shopping facility and providing customer assistance.

FIG. 9 illustrates a simplified flow diagram of an exemplary process 900 of cooperating a motorized transport unit with a movable item contain such that the motorized transport unit can drive the movable item container through a shopping facility and providing customer assistance. In step 902, a motorized wheel system of a motorized transport unit is activated by a control circuit. The control circuit, while activating the motorized wheel system, typically further continues to monitor location information to position the motorized transport unit under a movable item container, and aligns the motorized transport unit, based on the location information, relative to a frame of the item container. Typically, the item container is one of a plurality of movable item containers that are usable by customers and configured to be moved by customers through the shopping facility. In step 904, a lift system is activated to lift on the frame of the item container lifting a first portion of the item container such one or more wheels of the item container are lifted off of a floor while two or more other wheels of the item container remain in contact with the floor.

FIGS. 10A, 10B and 10C illustrate some embodiments of a motorized transport unit 202 detachably engaging a movable item container embodied as a shopping cart 302. In FIG. 3A, the motorized transport unit 202 is located proximate the movable item container with one or more arms 1002, levers, extensions or the like in a first, engagement or extended position. When in the engagement position, the arms are configured to cooperate with a base, frame 606 or other portion of the movable item container. For example, a pair of arms may be configured with lengths sufficient to allow each arm to contact a portion of the frame (e.g., cooperatively span a distance across the frame). In some instances, the width of the motorized transport unit when the arms are in the engagement position is such that the motorized transport unit cannot get between the wheels 306 of the movable item container or can be difficult to maneuver between the wheels 306. Accordingly, as illustrated in FIG. 10B, the arms may be rotated, retracted or otherwise moved to a second, aligned or narrowed position. In the aligned position, the motorized transport unit has a narrower width allowing the motorized transport unit to more readily move between the wheels 306 of the movable item container. In some embodiments, one or more motors and/or gearing are cooperated with the arms to implement the rotation of the arms. FIGS. 10A-10C illustrate the motorized transport unit moving in under the movable item container from a first direction (e.g., front of the cart), however, it will be appreciated by those skilled in the art that the motorized transport unit can move in from any direction that provides sufficient clearance (horizontally, such as between the wheels; and vertically).

Once the motorized transport unit 202 is in position (e.g., using sensors), as illustrated in FIG. 10C, the arms can be moved back to the engagement position to allow the arms to engage parts of the frame 606 of the movable item container. The arms can provide added support and stability when lifting at least a portion of the movable item container. In some implementations, the motorized transport unit may position itself relative to the movable item container such that the arms are adjacent to the front wheels, and potentially utilize the front wheels as a point of engagement. For example, the arms may rest against and push against the wheels or wheel housing as the motorized transport unit drives the movable item container through the shopping facility. Some applications further position the arms relative to the motorized transport unit such that the weight of the movable item container supported by the motorized transport unit is approximately centered on the motorized transport unit and/or allowing relatively balanced distribution of the weight across the wheels of the motorized transport unit.

One or more of the item container coupling structures 422 may be included on each arm 1002 allowing the item container coupling structures to be secured with the frame or corresponding coupling structures on the movable item containers. The item container coupling structure may be positioned on an end of each arm, and/or one or more item container coupling structures may be implemented at one or more locations along a length of each arm. In some embodiments, the one or more arms are rotatably cooperated with a body of the motorized transport unit, with at least one actuatable clamp positioned on each of the arms such that the arms are rotated to position the clamps relative to the frame of the item container. Additionally or alternatively, one or more item container coupling structures may be included on the housing of the motorized transport unit and/or cooperated with a frame of the motorized transport unit.

The arms are constructed of a strong, durable material, such as steel, stainless steel, other relevant alloy, or other material that is configured to support the expected weight of the movable item container and items placed into the movable item container. Cushioning may be included along some or all of the length of the arms, e.g., a rubberized or plastic coating. This cushioning can provide a soft contact between the motorized transport unit and the movable item container, limit a transfer of bumps from the motorized transport unit to the movable item container, limit potential damage to the frame of the movable item container and/or to the motorized transport unit, and the like. In some implementations, the arms may be configured to flex based on an expected weight to be supported, and/or be cooperated with the motorized transport unit with one or more springs or flexing members that provide cushioning.

The lift system 804 may directly cooperate with the arms 1002, such that the lift system causes the arms to elevate and lift the movable item container. In other instances, however, the arms are elevated as a portion of the motorized transport unit lifts. The arms may further be configured to accommodate misalignment and/or damage to the frame of the movable item container and/or the arm. For example, the arms may be configured to extend beyond the frame or other movable item container intended to be picked up.

The item container coupling structures 422 can be substantially any relevant coupling structure that can cooperate the motorized transport unit with the movable item container. For example, the item container coupling structures may include one or more clamps, hooks, latches, posts, recesses, and other such coupling structures. Some implementations include one or more actuatable clamps controlled by the control circuit. The control circuit, in response to positioning the motorized transport unit under the item container and aligned relative to the frame of the item container, can activate the clamps to engage and removably clamp to the frame of the item container and temporarily secure the motorized transport unit with the item container.

Further, the item container coupling structures and/or the arms can be configured to accommodate slight variations between the frame of the movable item container and positioning of the motorized transport unit when trying to cooperate with the movable item container and motorized transport unit (e.g., carts may vary, for example, because of being damaged and the like). In some instances, the coupling structure and/or movable item container may include one or more guides or other such structure to help achieve desired alignment of the coupling structure and the part of the movable item container that is being secured (e.g., lateral bar of the frame). Additionally, the item container coupling structure may be configured to move horizontally and/or vertically relative to the motorized transport unit to allow for alignment. The arms may also be configured to provide for slight variations (e.g., may be able to extend or retract at least a small distance) to allow for easier cooperation. Further, the lift system may lift one side of the motorized transport unit and/or an arm higher than the other to achieve a cooperation of the coupling structure with the movable item container. Some embodiments include coupling structure sensors to ensure the coupling structures have achieved a secure cooperation with the movable item container.

In some embodiments, the sensors 414 may include one or more traction and/or slip sensors. For example, a traction sensor may be cooperated with one or more of the wheels and/or axles of the motorized transport unit and can detect and/or index the rotation of one or more wheels and/or axles of the wheels. As such, in some instances, the control circuit and/or the motorized wheel system can receive traction sensor data that may indicate a reduction in traction of one or more wheels of the motorized wheel system (e.g., can detect when a wheel is moving faster than expected). In some instances, the control circuit and/or the motorized wheel system can detect a reduction or lack of traction relative to one or more wheels based on the rate of rotation of a the wheel relative to the rate of rotation of one or more other wheel (e.g., rate of rotation is different by a threshold amount).

The control circuit can be configured to take corrective action in response to a detection of a reduction or loss of traction. In some implementations, the one or more traction sensors cooperate with the motorized wheel system and are configured to detect a reduction in traction of one or more wheels of the motorized wheel system. In some embodiments, the control circuit is configured to activate one or more of the lift systems 804 to adjust a lift height of one side or quadrant of the item container 302 relative to the one or more wheels of the motorized transport unit corresponding to the detected reduction in traction. The change in height can increase weight on the one or more wheels relative to other wheels of the motorized wheel system, which may overcome the reduction in traction. For example, some embodiments include one or more traction sensors cooperated with the motorized wheel system and configured to detect a reduction in traction of one or more wheels of the motorized wheel system. The control circuit is coupled with the one or more traction sensors, and further configured to activate the lift system to adjust a lift height of one side of the item container relative to the one or more wheels corresponding to the detected reduction in traction to increase weight on the one or more wheels relative to other wheels of the motorized wheel system.

Additionally or alternatively, the motorized wheel system can be controlled to slow down or speed up one or more wheels in attempts to enhance traction of the one or more wheels or others of the one or more wheels. Still further, one or more notifications can be communicated to the central computer system and/or to a customer or other user (e.g., through a communication to a corresponding user interface unit, a display on the movable item container, lights and/or sounds from the motorized transport unit and/or the movable item container, other such notification, or combinations of two or more of such notifications).

Similarly, the lift system may be used to balance the weight of the movable item container (and items placed in the item container). For example, one or more lifting devices can be activated to elevate one side or the other in attempts to help balance the weight. Some embodiments may include weight detectors and/or level detectors that can detect an imbalance of weight. Accordingly, the lift system can activate one or more lifting devices in attempts to at least partially compensate for the imbalance.

In some embodiments, the motorized transport unit does not lift any portion of the movable item container. Instead, the motorized transport unit can position itself relative to the movable item container and activate the one or more item container coupling structures to secure the motorized transport unit with the item container. The motorized transport unit can then drive and/or tow the movable item container. Some applications position the motorized transport unit near or at the front of the movable item container while still providing the front wheels with clearance to freely rotate and/or swing (e.g., in some instances swing 360°). The lift system may still be used, without intent to fully lift a portion of the movable item container off the floor. Instead, the lift system can be activated to increase pressure on wheels of the movable item container and allow the movable item container to achieve more traction. Further sensors can be used (e.g., pull sensors, skid sensors, traction sensor, etc.) to identify when to increase pressure on the motorized transport unit, which can trigger one or more lifting devices to increase a lift force, but not lifting the movable item container. Further, one or more sensor (e.g., distance sensors, range sensor, tilt sensors, other such sensors, or combination of two or more of such sensors) can be employed to prevent the lift system from lifting too high and lifting one or both of the front wheels 306 of the movable item container off the floor.

It can be difficult for the motorized transport unit to separate two movable item containers (e.g., shopping carts 302) when they have been forced or "seated" together. Accordingly, some embodiments utilize one or more seating blocks, bumpers, stops, or other devices to limit how compressed together the movable item containers can be.

FIG. 11A illustrates an exemplary movable item container, embodied as shopping carts 302, with a seating block 1102, in accordance with some embodiments. FIG. 11B illustrates some embodiments of two seated movable item containers, embodied as shopping carts 302. The shopping carts 302 further include seating blocks 1102. The seating blocks are positioned on the shopping carts to limit how closely two or more shopping carts can be positioned relative to each other and/or seated. Because the carts cannot be forced together too tightly, the motorized transport unit typically has sufficient power and traction to separate two seated carts. Still further, in some instances, the seating blocks maintain a distance between carts to allow the motorized transport unit to move underneath a front most cart, cooperate with the cart and move the cart away from the other one or more carts with which it is seated. This may include providing sufficient room to allow the motorized transport unit to move in under the shopping cart from the side of the cart.

In some embodiments, systems, apparatuses and methods are provided herein useful to provide customer assistance. In some embodiments, a motorized transport unit providing customer assistance at a shopping facility, comprises: a transceiver configured to wirelessly receive communications from a remote central computer system; a control circuit coupled with the transceiver; a motorized wheel system controlled by the control circuit; a lift system controlled by the control circuit; and a memory coupled to the control circuit and storing computer instructions that when executed by the control circuit cause the control circuit to: activate the motorized wheel system, while continuing to monitor location information, to position the motorized transport unit under the item container and aligned, based on the location information, relative to a frame of the item container, wherein the item container is one of a plurality of item containers that are usable by customers and configured to be moved by customers through the shopping facility; and activate the lift system to lift on the frame of the item container lifting a first portion of the item container such one or more wheels of the item container are lifted off of a floor while two or more other wheels of the item container remain in contact with the floor.

In some embodiments, a method of providing customer assistance at a shopping facility, comprises: by a control circuit: activating a motorized wheel system of a motorized transport unit, while continuing to monitor location information, to position the motorized transport unit under the item container and aligned, based on the location information, relative to a frame of the item container, wherein the item container is one of a plurality of item containers that are usable by customers and configured to be moved by customers through a shopping facility; activating a lift system to lift on the frame of the item container lifting a first portion of the item container such that one or more wheels of the item container are lifted off of a floor while two or more other wheels of the item container remain in contact with the floor.

In some embodiments, a motorized transport unit providing customer assistance at a shopping facility, comprises: a transceiver configured to wirelessly receive communications from a remote central computer system; a control circuit coupled with the transceiver; a motorized wheel system controlled by the control circuit; a lift system controlled by the control circuit; and a memory coupled to the control circuit and storing computer instructions that when executed by the control circuit cause the control circuit to: activate the motorized wheel system, while continuing to monitor location information, to position the motorized transport unit under the item container and aligned, based on the location information, relative to a frame of the item container, wherein the item container is one of a plurality of item containers that are usable by customers and configured to be moved by customers through the shopping facility; and activate the lift system to lift on the frame of the item container lifting a first portion of the item container such one or more wheels of the item container are lifted off of a floor while two or more other wheels of the item container remain in contact with the floor.

In some embodiments, a method of providing customer assistance at a shopping facility, comprises: by a control circuit: activating a motorized wheel system of a motorized transport unit, while continuing to monitor location information, to position the motorized transport unit under the item container and aligned, based on the location information, relative to a frame of the item container, wherein the item container is one of a plurality of item containers that are usable by customers and configured to be moved by customers through a shopping facility; activating a lift system to lift on the frame of the item container lifting a first portion of the item container such that one or more wheels of the item container are lifted off of a floor while two or more other wheels of the item container remain in contact with the floor.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A motorized transport unit providing customer assistance at a shopping facility, comprising:
    a transceiver configured to wirelessly receive communications from a remote central computer system;
    a control circuit coupled with the transceiver;
    a motorized wheel system controlled by the control circuit;
    a lift system controlled by the control circuit, wherein the lift system comprises at least a pair of arms that are rotatably cooperated with a body of the motorized transport unit;
    at least one actuatable clamp positioned on each of the arms and controlled by the control circuit; and
    a memory coupled to the control circuit and storing computer instructions that when executed by the control circuit cause the control circuit to:
        activate the motorized wheel system, while continuing to monitor location information, to position the motorized transport unit under an item container and aligned, based on the location information, relative to a frame of the item container, wherein the item container is one of a plurality of item containers that are usable by customers and configured to be moved by customers through the shopping facility;
        cause the arms of the lift system to rotate to position a portion of the arms under the frame of the item container and position the clamps relative to the frame of the item container;
        control the actuatable clamps, while the motorized transport unit is positioned under the item container with the arms rotated to position the portion of the arms under the frame of the item container and aligned relative to the frame of the item container, to engage and removably clamp with the frame of the item container and temporarily secure the motorized transport unit with the item container;
        activate the lift system to lift on the frame of the item container lifting a first portion of the item container such one or more wheels of the item container are lifted off of a floor while two or more other wheels of the item container remain in contact with the floor.

2. The motorized transport unit of claim 1, wherein the control circuit is further configured to activate the motorized wheel system, in accordance with shopping route instructions received from the central computer system, to drive the item container through the shopping facility along a shopping route while the two or more other wheels of the item container continue to be in contact with the floor and supporting a portion of the weight of the item container and products placed into the item container.

3. The motorized transport unit of claim 1, further comprising:
one or more wireless tag sensors coupled with the control circuit;
wherein the control circuit is further configured to receive, from the one or more wireless tag sensors, the location information comprising tag location information wirelessly detected from multiple different wireless tags positioned at different positions on the item container, and to identify a location and orientation of the item container relative to the motorized transport unit based on the tag location information detected by the one or more wireless tag sensors.

4. The motorized transport unit of claim 3, wherein the control circuit is further configured to:
wirelessly receive positioning route instructions from the central computer system; and
activate the motorized wheel system to move the motorized transport unit through at least a portion of the shopping facility and to position the motorized transport unit, in accordance with the positioning route instructions, proximate the movable item container such that the one or more wireless tag sensors are capable of sensing at least one of the wireless tags on the item container.

5. The motorized transport unit of claim 1, further comprising:
one or more traction sensors cooperated with the motorized wheel system and configured to detect a reduction in traction of one or more wheels of the motorized wheel system;
wherein the control circuit is coupled with the one or more traction sensors, and further configured to activate the lift system to adjust a lift height of one side of the item container relative to the one or more wheels corresponding to the detected reduction in traction to increase weight on the one or more wheels relative to other wheels of the motorized wheel system.

6. The motorized transport unit of claim 1, wherein the lift system comprises a plurality of hydraulic lifts that are spaced relative to each other and upon activation lift the one or more wheels of the item container off of the floor.

7. The motorized transport unit of claim 6, further comprising:
the body having a top portion and a bottom portion;
wherein the hydraulic lifts cooperate with at least the top portion such that when activated cause the top portion to lift relative to the bottom portion and lifting the first portion of the item container.

8. A motorized transport unit providing customer assistance at a shopping facility, comprising:
a transceiver configured to wirelessly receive communications from a remote central computer system;
a control circuit coupled with the transceiver;
a motorized wheel system controlled by the control circuit;
a lift system controlled by the control circuit, wherein the lift system comprises at least a pair of arms that are rotatably cooperated with a body of the motorized transport unit; and
a memory coupled to the control circuit and storing computer instructions that when executed by the control circuit cause the control circuit to:
activate the motorized wheel system, while continuing to monitor location information, to position the motorized transport unit under an item container and aligned, based on the location information, relative to a frame of the item container, wherein the item container is one of a plurality of item containers that are usable by customers and configured to be moved by customers through the shopping facility;
cause the arms of the lift system to rotate to position a portion of the arms under the frame of the item container; and
activate the lift system to lift on the frame of the item container lifting a first portion of the item container such one or more wheels of the item container are lifted off of a floor while two or more other wheels of the item container remain in contact with the floor;
wherein the lift system comprises a plurality of lifts spaced relative to each other and communicatively coupled with the control circuit, wherein the control circuit is configured to control the lifts to at least partially compensate for a weight imbalance of the item container relative to the motorized transport unit.

9. A motorized transport unit providing customer assistance at a shopping facility, comprising:
a transceiver configured to wirelessly receive communications from a remote central computer system;
a control circuit coupled with the transceiver;
a motorized wheel system controlled by the control circuit;
one or more wireless tag sensors coupled with the control circuit;
a lift system controlled by the control circuit, wherein the lift system comprises at least a pair of arms that are rotatably cooperated with a body of the motorized transport unit; and
a memory coupled to the control circuit and storing computer instructions that when executed by the control circuit cause the control circuit to:
activate the motorized wheel system, while continuing to monitor location information, to position the motorized transport unit under an item container and aligned, based on the location information, relative to a frame of the item container, wherein the item container is one of a plurality of item containers that are usable by customers and configured to be moved by customers through the shopping facility;
receive, from the one or more wireless tag sensors, the location information comprising tag location information wirelessly detected from multiple different wireless tags positioned at different positions on the item container, and to identify a location and orientation of the item container relative to the motorized transport unit based on the tag location information detected by the one or more wireless tag sensors;
cause the arms of the lift system to rotate to position a portion of the arms under the frame of the item container; and
activate the lift system to lift on the frame of the item container lifting a first portion of the item container such one or more wheels of the item container are lifted off of a floor while two or more other wheels of the item container remain in contact with the floor; and wherein the control circuit in identifying the orientation of the item container is configured to:

determine a shape based on the tag location information relative to a virtual modeled shape that corresponds to a reference model; and determine the orientation of the motorized transport unit relative to the orientation of the item container based on differences between the detected modeled shape relative to a reference shape including a rotation of the detected model shape relative to the reference shape.

10. A method of providing customer assistance at a shopping facility, comprising:

by a control circuit:

activating a motorized wheel system of a motorized transport unit, while continuing to monitor location information, to position the motorized transport unit under an item container and aligned, based on the location information, relative to a frame of the item container, wherein the item container is one of a plurality of item containers that are usable by customers and configured to be moved by customers through the shopping facility;

causing arms of a lift system to rotate to position a portion of the arms under the frame of the item container;

positioning clamps each secured with one of the arms relative to the frame; and activating the clamps when in position under and aligned with the frame of the item container to engage and removably clamp with the frame of the item container and temporarily secure the clamps and the motorized transport unit with the item container;

activating the lift system to lift on the frame of the item container lifting a first portion of the item container such that one or more wheels of the item container are lifted off of a floor while two or more other wheels of the item container remain in contact with the floor.

11. The method of claim 10, further comprising:

activating the motorized wheel system, in accordance with shopping route instructions received from a central computer system, to drive the item container through the shopping facility along a shopping route while the two or more other wheels of the item container continue to be in contact with the floor and supporting a portion of the weight of the item container and products placed into the item container.

12. The method of claim 10, further comprising:

receiving, from one or more wireless tag sensors of the motorized transport unit, the location information comprising tag location information wirelessly detected from multiple different wireless tags positioned at different positions on the item container; and identifying a location and orientation of the item container relative to the motorized transport unit based on the tag location information detected by the one or more wireless tag sensors.

13. The method of claim 12, further comprising:

wirelessly receiving positioning route instructions from a central computer system; and activating the motorized wheel system to move the motorized transport unit through at least a portion of the shopping facility and to position the motorized transport unit, in accordance with the positioning route instructions, proximate the item container such that the one or more wireless tag sensors are capable of sensing at least one of the wireless tags on the item container.

14. The method of claim 10, further comprising:

receiving, from one or more traction sensors cooperated with the motorized wheel system, traction sensor data indicating a reduction in traction of one or more wheels of the motorized wheel system; and activating the lift system to adjust a lift height of one side of the item container relative to the one or more wheels corresponding to the detected reduction in traction to increase weight on the one or more wheels relative to other wheels of the motorized wheel system.

15. The method of claim 10, wherein the activating the lift system comprises activating each of a plurality of hydraulic lifts that are spaced relative to each other to cause, upon activation, the lifting the one or more wheels of the item container off of the floor.

16. The method of claim 15, wherein the lift system is cooperated with a top portion of a body of the motorized transport unit; and wherein the activating the hydraulic lifts comprises lifting the top portion of the motorized transport unit relative to a bottom portion and lifting the first portion of the item container.

* * * * *

UNITED STATES PATENT AND TRADEMARK OFFICE
CERTIFICATE OF CORRECTION

PATENT NO. : 10,611,614 B2
APPLICATION NO. : 15/892250
DATED : April 7, 2020
INVENTOR(S) : Donald R. High et al.

Page 1 of 1

It is certified that error appears in the above-identified patent and that said Letters Patent is hereby corrected as shown below:

In the Claims

Column 29, Line 31, Claim 4, delete "movable".

Signed and Sealed this
Eleventh Day of August, 2020

Andrei Iancu
*Director of the United States Patent and Trademark Office*